US012125277B1

United States Patent
Shin et al.

(10) Patent No.: US 12,125,277 B1
(45) Date of Patent: Oct. 22, 2024

(54) REAL-TIME PERSISTENT OBJECT TRACKING FOR INTELLIGENT VIDEO ANALYTICS SYSTEMS

(71) Applicant: NVIDIA Corporation, Santa Clara, CA (US)

(72) Inventors: Joonhwa Shin, Santa Clara, CA (US); Fangyu Li, San Jose, CA (US); Zheng Liu, Los Altos, CA (US); Kaustubh Purandare, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 433 days.

(21) Appl. No.: 17/503,180

(22) Filed: Oct. 15, 2021

(51) Int. Cl.
  *G06V 20/40*   (2022.01)
  *G06F 18/28*   (2023.01)
  (Continued)

(52) U.S. Cl.
  CPC .............. *G06V 20/41* (2022.01); *G06F 18/28* (2023.01); *G06N 3/044* (2023.01); *G06N 3/08* (2013.01); *G06T 7/20* (2013.01); *G06T 7/70* (2017.01); *G06V 10/225* (2022.01); *G06V 10/25* (2022.01); *G06V 10/95* (2022.01);
  (Continued)

(58) Field of Classification Search
  CPC ...... G06V 20/41; G06V 10/225; G06V 10/25; G06V 10/95; G06V 2201/07; G06F 18/28; G06N 3/044; G06N 3/08; G06T 7/20; G06T 7/70; G06T 2207/10016; G06T 2207/20081; G06T 2207/20084; G06T 2207/30232; G06T 2207/30241; G06T 2207/30248
  See application file for complete search history.

(56) References Cited

U.S. PATENT DOCUMENTS

2019/0130582 A1 * 5/2019 Cheng .................. G06T 7/11
2020/0027217 A1 * 1/2020 Yokota ................ G06V 20/58
(Continued)

*Primary Examiner* — Amara Abdi
(74) *Attorney, Agent, or Firm* — LOWENSTEIN SANDLER LLP

(57) ABSTRACT

Apparatuses, systems, and techniques for real-time persistent object tracking for intelligent video analytics systems. A state of a first object included in an environment may be tracked based on a first set of images depicting the environment. The first set of images may be generated during a first time period. It may be determined that the first object is not detected in the environment depicted in a second set of images. The second set of images may be generated during a second time period that is subsequent to the first time period. One or more predicted future states of the first object may be obtained in view of the state of the first object in the environment depicted in the first set of images. A second object may be detected in the environment depicted in a third set of images generated during a third time period that is subsequent to the second time period. A determination may be made as to whether a current state of the second object corresponds to at least one of the one or more predicted future states of the first object. In response to a determination that a current state of the second object corresponds to at least one of the predicted future states of the first object, an identifier associated with the second object is updated to correspond to an identifier associated with the first object.

18 Claims, 15 Drawing Sheets

(51) Int. Cl.
*G06N 3/044* (2023.01)
*G06N 3/08* (2023.01)
*G06T 7/20* (2017.01)
*G06T 7/70* (2017.01)
*G06V 10/22* (2022.01)
*G06V 10/25* (2022.01)
*G06V 10/94* (2022.01)

(52) U.S. Cl.
CPC .............. *G06T 2207/10016* (2013.01); *G06T 2207/20081* (2013.01); *G06T 2207/20084* (2013.01); *G06T 2207/30232* (2013.01); *G06T 2207/30241* (2013.01); *G06T 2207/30248* (2013.01); *G06V 2201/07* (2022.01)

(56) References Cited

U.S. PATENT DOCUMENTS

| | | | |
|---|---|---|---|
| 2020/0380274 A1 | 12/2020 | Shin et al. | |
| 2021/0279475 A1* | 9/2021 | Tusch | H04L 63/0861 |
| 2022/0282980 A1* | 9/2022 | Winarski | G01C 21/3446 |
| 2022/0292286 A1* | 9/2022 | Subramanian | G06T 7/277 |
| 2023/0028152 A1* | 1/2023 | Sharma | G06F 16/29 |

\* cited by examiner

400

Track a state of a first object included in an environment based on a first set of images depicting the environment generated during a first time period 410

Determine that the first object is not detected in the environment depicted in a second set of images generated during a second time period 412

Obtain one or more future states of the first object in view of the location of the first object in the environment depicted in the first set of images 414

Detect a second object included in the environment depicted in a third set of images generated during a third time period 416

Determine that a current state of the second object corresponds to at least one of the one or more future states of the first object 418

Update an identifier associated with the second object to correspond to an identifier associated with the first object 420

FIG. 4

REAL-TIME PERSISTENT OBJECT TRACKING FOR INTELLIGENT VIDEO ANALYTICS SYSTEMS

TECHNICAL FIELD

At least one embodiment pertains to processing resources used for real-time persistent object tracking for intelligent video analytics systems. For example, at least one embodiment pertains to processors or computing systems used to provide and enable association of new objects detected in an environment to lost objects tracked by an intelligent video analytics system in real-time, according to various novel techniques described herein.

BACKGROUND

Efficient and effective object tracking is a critical task in video analytics applications, such as video analytics, video surveillance, activity recognition, vehicle navigation, etc. Some systems may utilize one or more object detection models to detect objects included in images depicting an environment. Such systems may estimate a state (e.g., a position, a location, a size, a scale, a velocity, etc.) of the detected object within the environment relative to a camera that generated the images, relative to other objects included in the environment, etc. The system may track the detected object's (also referred to as a target) state in subsequent images depicting the environment and may provide information associated with the target's state to a user of the system (e.g., via a client device, etc.).

BRIEF DESCRIPTION OF DRAWINGS

Various embodiments in accordance with the present disclosure will be described with reference to the drawings, in which:

FIG. 4 depicts an example method of managing lost objects tracked by an intelligent video analytics system, according to at least one embodiment;

DETAILED DESCRIPTION

Figure 1:
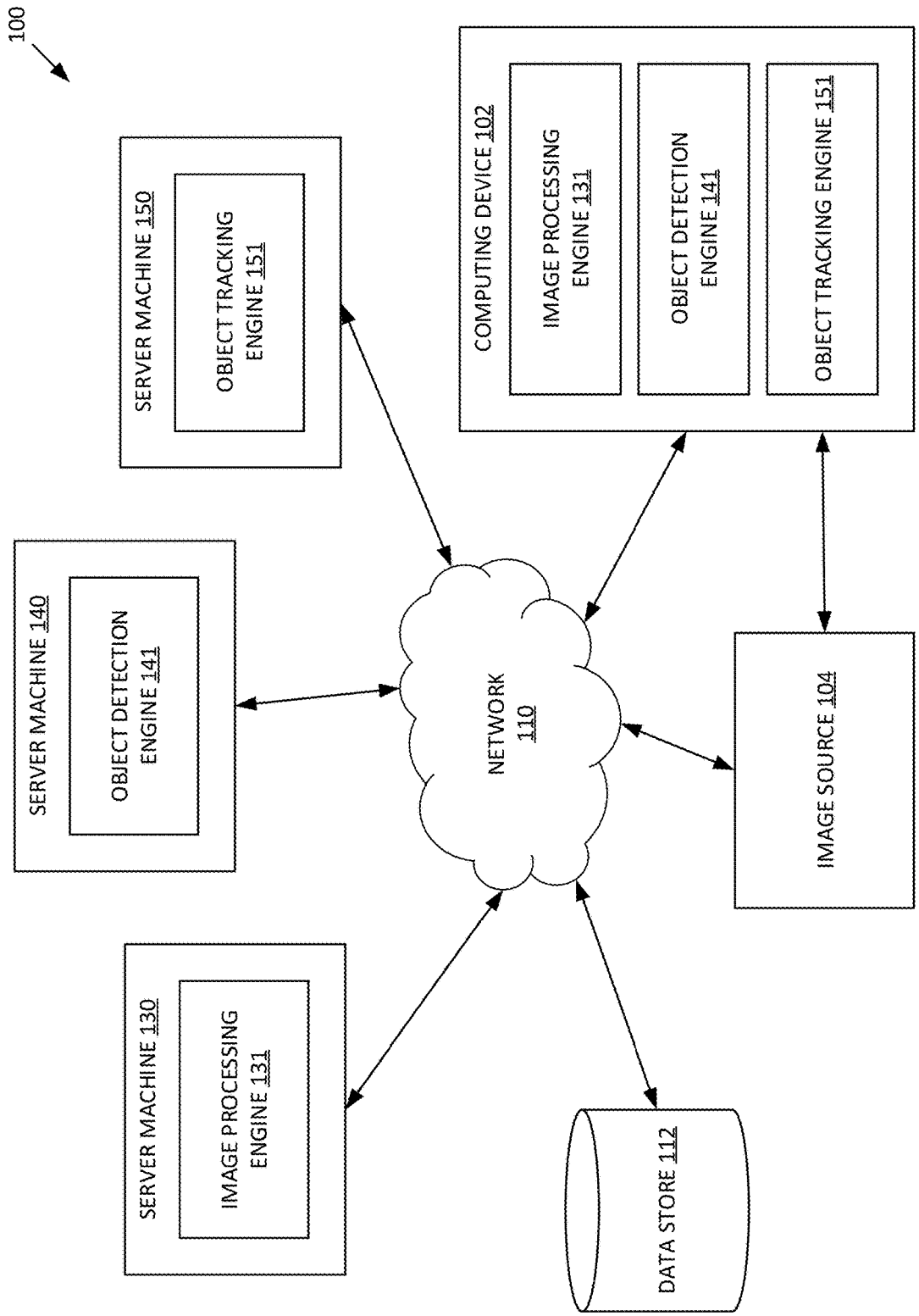
FIG. 1 is a block diagram of an example system architecture, according to at least one embodiment.

Accurately detecting and tracking objects included in images is a challenging task. Modern video analytics systems, such as object monitoring systems, etc., may track an object in an environment by detecting the object in an image (e.g., a video frame) generated by a camera surveilling the environment and monitoring the state (e.g., location, position, speed, velocity, etc.) of the detected object in subsequent images generated by the camera. In some instances, an occlusion event can occur during monitoring of a tracked object (referred to herein as a target object or a target). An occlusion occurs when two or more objects in an environment come too close and seemingly merge or combine with each other, which prevents the video analytics system from differentiating between the two or more objects. For example, a partial occlusion (i.e., an object is partially merged or combined with another object) or full occlusion (i.e., an object is fully merged or combined with another object) can occur when a target in an environment moves in front of or behind a static object or another moving object or target, relative to a location of the camera that is surveilling the environment. During the occlusion event, the video analytics system may not detect the presence of a target in the environment, as the target may be partially or fully obscured. After the occlusion event, the target may move away from the other object or target (or vice versa) and the target may no longer be partially or fully obscured.

A video analytics system may lose track of a target during or after an occlusion event. For example, when a target is no longer partially or fully obscured by another object or target, the video analytics system may again detect the presence of the same object. However, the system may incorrectly identify the object as a new object instead of identifying the detected object as a target that had been tracked before the occlusion event. In some environments (e.g., a busy sidewalk, a crowded event space, etc.), targets can undergo multiple occlusion events as the video analytics system tracks such targets. Each time that a target becomes occluded (e.g., by another object) from the field of view of the monitoring system (camera) and appears (re-emerges) from the occluding object, the system may incorrectly identify the target as a newly detected object instead of identifying the object as an existing (e.g., previously detected) target. Accordingly, the system may incorrectly detect and subsequently track more targets than are actually present in the environment that is being surveilled. This incorrect object tracking can decrease an overall accuracy of the video analytics system. In addition, tracking more targets than are actually present in the environment being surveilled can consume a significant amount of computing resources (e.g., processing cycles, storage space, etc.). As a result, an overall efficiency of the system can decrease and an overall latency of the system can increase.

Embodiments of the present disclosure propose a technique to associate lost targets with newly detected objects after an occlusion event in real time or near real time (e.g., as a video of an environment is generated). A video analytics system may track a state (e.g., location, position, scale, velocity, etc.) of a target included in an environment relative to a position or location of a camera that is surveilling the environment. The system may track the state of the target by obtaining a first set of images (e.g., video frames) depicting the environment during a first time period and monitoring a state of the target (e.g., in view of bounding boxes obtained from an output of an object detection model, etc.) in the first set of images. During a second time period, the target may undergo an occlusion event (e.g., the first target may move in front of or behind another object or target within the environment relative to the camera). The system may obtain a second set of images depicting the environment during the second time period and determine that the target is not detected in the environment depicted in the second set of images (e.g., there are no bounding boxes associated with the second set of images that correspond to the first target).

The system may estimate one or more future states of the target within the environment. In some embodiments, the system may estimate one or more future states in response to determining that the target is not detected in the environment depicted in the second set of images. In other or similar embodiments, the system may estimate the one or more future states while tracking the target based on the first set of images (i.e., before the target is lost in the environment). The one or more future states of the target may be estimated in view of state data associated with the target in view of the first set of images. For example, the system may maintain state data associated with the target based on the location or position of the target detected in each of the first set of images. In some embodiments, the state data associated with the target may include coordinates (e.g., Cartesian coordinates, etc.) corresponding to regions of the environment that include the target before or at the time of the occlusion, a size and/or shape of one or more bounding boxes (i.e., associated with the first set of images) corresponding to the target detected at the regions of the environment, and/or a velocity of the first target within the environment. In some embodiments, the state data may also include coordinates corresponding to regions of the environment that are expected to include the target after the time of the occlusion (e.g., at a future time period). The system may obtain the state data associated with the target using one or more state functions (e.g., one or more Kalman filter functions, etc.) and/or a machine learning model (e.g., a recurrent neural network, etc.).

The system may calculate a path (e.g., a linear path, a non-linear path, etc.) that the target is expected to follow in the environment during or after the occlusion event based on the state data obtained for the target. For example, the system may calculate the path based on one or more coordinates corresponding to regions of the environment that include the target before or at the time of the occlusion (i.e., during the first time period) and one or more coordinates corresponding to regions of the environment that are expected to include the target after the time of the occlusion (i.e., during a future time period). In another example, the system may calculate the path based on one or more coordinates corresponding to regions of the environment that include the target before or at the time of the occlusion and the velocity of the target within the environment during the first time period. In some embodiments, the calculated path may include a set of coordinates that the target is expected to follow within the environment during the future time period. Each of the set of coordinates may correspond to a future state of the target during the future time period. The system may store an indication of the calculated path in a data store configured to store future paths for targets that are lost by the video analytics system.

In some embodiments, the system may detect another object in the environment depicted in a third set of images that are generated after the occlusion of the target (i.e., during a third time period) and may determine a current state of the detected object in the environment. The current state of the object may correspond to a set of coordinates for regions of the third set of images that depict a presence of the object. In some embodiments, the system may determine that the object is detected in a region of the environment that is at or near the region that included the target before the target was lost by the occlusion. In such embodiments, the system may obtain the calculated path associated with the target from the data store and may compare the current state of the detected object with each of one or more future states of the target (i.e., indicated by the calculated path). In one example, the system may calculate similarity metrics by performing a time series analysis (e.g., a dynamic time warping analysis) based on the current state of the detected object and the future states of the target. Responsive to determining that a calculated similarity metric for the state of the object and a respective future state of the target satisfies a similarity criterion (e.g., exceeds a similarity metric threshold), the system may determine that the detected object corresponds to the target (i.e., that the lost target has reappeared as the detected object). The system may associate the detected object with the target and may continue to track the target in accordance with embodiments described above.

Aspects and embodiments of the present disclosure provide a technique to reassociate lost targets with newly detected objects after an occlusion event in real time or near real time (e.g., as frames of a video are generated by one or more cameras). By re-associating lost targets with newly detected objects in real time, a video analytics system does not incorrectly track more targets than are actually present in an environment being surveilled. Additionally, an accuracy of the video analytics system is improved in embodiments. In addition, the amount of time of a post-processing phase for a video or video stream may be reduced, as a user or operator of the video analytics system does not manually associate lost targets with other objects detected in an environment after a complete video is generated. In view of the above, the overall accuracy of such video analytics systems may be high and such systems may consume fewer computing resources (e.g., processing cycles, etc.) as compared to prior object tracking systems, which increases an overall efficiency and increases an overall latency of the system.

System Architecture

FIG. 1 is a block diagram of an example system architecture 100, according to at least one embodiment. The system architecture 100 (also referred to as "system" herein) may include a computing device 102, an image source 104, one or more data stores 112, and/or server machines (e.g., server machines 130-150), each connected to a network 110. In implementations, network 110 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Computing device 102 may be a desktop computer, a laptop computer, a smartphone, a tablet computer, a server, or any suitable computing device capable of performing the techniques described herein. In some embodiments, computing device 102 may be a computing device of a cloud computing platform. For example, computing device 102 may be, or may be a component of, a server machine of a cloud computing platform. In such embodiments, computing device 102 may be coupled to one or more edge devices (not shown) via network 110. An edge device refers to a computing device that enables communication between computing devices at the boundary of two networks. For example, an edge device may be connected to computing device 102, data store 112, server machine 130, server machine 140, and/or server machine 150 via network 110, and may be connected to one or more endpoint devices (not shown) via another network. In such example, the edge device can enable communication between computing device 102, data store 112, server machine 130, server machine 140, and/or server machine 150 and the one or more endpoint devices. In other or similar embodiments, computing device 102 may be, or may be a component of, an edge device. For example, computing device 102 may facilitate communication between data store 112, server machine 130, server machine 140, and/or server machine 150, which are connected to computing device 102 via network 110, and one or more endpoint devices that are connected to computing device 102 via another network.

In still other or similar embodiments, computing device 102 may be, or may be a component of, an endpoint device. For example, computing device 102 may be, or may be a component of, devices, such as, but not limited to: televisions, smart phones, cellular telephones, personal digital assistants (PDAs), portable media players, netbooks, laptop computers, electronic book readers, tablet computers, desktop computers, set-top boxes, gaming consoles, autonomous vehicles, surveillance devices, and the like. In such embodiments, computing device 102 may be connected to data store 112, server machine 130, server machine 140 and/or server machine 150 via network 110. In other or similar embodiments, computing device 102 may be connected to an edge device (not shown) of system 100 via a network and the edge device of system 100 may be connected to data store 112, server machine 130, server machine 140 and/or server machine 150 via network 110.

Image source 104 may be or may include one or sensors that are configured to generate data, such as visual data, audio data, etc., associated with an environment. The sensors can include an image sensor (e.g., a camera), a light detection and ranging (LIDAR) sensor, a radio detection and ranging (RADAR) sensor, sound navigation and ranging (SONAR) sensor, an ultrasonic sensor, a microphone, and other sensor types. In some embodiments, the data collected and/or generated by the sensors may represent a perception of the environment by the sensors. It should be noted that although some embodiments of the present disclosure are directed to image data (e.g., an image) generated by one or more sensors of image source 104, embodiments of the present disclosure may be applied to any type of data generated by one or more sensors of image source 104 (e.g., LIDAR data, RADAR data, SONAR data, ultrasonic data, audio data, etc.).

In some embodiments, image source 104 may be a component of, or may be otherwise connected to, computing device 102. For example, as described above, computing device 102 may be, or may be a component of, an endpoint device. In such embodiments, image source 104 may be a camera component of computing device 102 that is configured to generate an image and/or video data associated with the environment. In other or similar embodiments, image source 104 may be a device, or a component of or otherwise connected to a device that is separate and distinct from computing device 102. For example, as described above, computing device 102 may be, or may be a component of, a cloud computing platform or an edge device. In such embodiments, image source 104 may be a device (e.g., a surveillance camera, a device of an autonomous vehicle, etc.) that is connected to computing device 102, data store 112, and/or server machines 130-150 via network 110 or another network.

In some implementations, data store 112 is a persistent storage that is capable of storing content items (e.g., images) and data associated with the stored content items (e.g., object data, image metadata, etc.) as well as data structures to tag, organize, and index the content items and/or object data. Data store 112 may be hosted by one or more storage devices, such as main memory, magnetic or optical storage based disks, tapes or hard drives, NAS, SAN, and so forth. In some implementations, data store 112 may be a network-attached file server, while in other embodiments data store 112 may be some other type of persistent storage such as an object-oriented database, a relational database, and so forth, that may be hosted by computing device 102 or one or more different machines coupled to the computing device 102 via network 110 or another network.

Data store 112 may be or may include a domain-specific or organization-specific repository or data base. In some embodiments, computing device 102, image source 104, server machine 130, server machine 140, and/or server machine 150 may only be able to access data store via network 110, which may be a private network. In other or similar embodiments, data stored at data store 112 may be encrypted and may be accessible to computing device 102, image source 104, server machine 130, server machine 140, and/or server machine 150 via an encryption mechanism (e.g., a private encryption key, etc.). In additional or alternative embodiments, data store 112 may be a publicly accessible data store that is accessible to any device via a public network.

Server machine 130 may include an image processing engine 131 that is configured to process data generated by image source 104. For example, image source 104 and/or computing device 102 may encode image data (e.g., using a codec) generated by image source 104 prior to transmitting the image data to another device of system 100 via network 110 (or another network). Image processing engine 131 may decode the encoded image data (e.g., using the codec). In some embodiments, image processing engine 131 may re-encode decoded image data (e.g., using a different codec), prior to providing the image to another component or device of system 100. In some embodiments, image process engine 131 may be configured to select, combine, and transmit signals (e.g., via a multiplexer component, etc.) associated with image data generated by image source 104 to another component or device of system 100. In additional or alternative embodiments, image processing engine 131 may be configured to modify a quality of the image data generated by image source 104 before the image data is used for object detection and/or object tracking (e.g., by object detection engine 141 and/or object tracking engine 151). For example, image processing engine 131 may be configured to apply one or more transformations to an image generated by image source 104 to remove or reduce an amount of noise present in the image, to crop the image, and so on. It should be noted that although some embodiments of the present disclosure provide that image processing engine 131 may modify a quality of image data, other components of system 100 (e.g., object detection engine 141, object tracking engine 151, etc.) may also be configured to modify the quality of the image data.

Server machine 140 may include an object detection engine 141 configured to detect one or more objects included in images depicting an environment, such as images generated by image source 104. In some embodiments, object detection engine 141 may provide an image depicting an environment as input to a trained object detection model. The object detection model may be trained using historical data (e.g., historical images, historical object data, etc.) from one or more datasets to detect an object (referred to here as a detected object) included in a given input image depicting an environment, and estimate a region of the given input image that includes the detected object (referred to herein as a region of interest). In some embodiments, one or more outputs of the object detection model can indicate object data associated with the detected object. The object data may indicate a region of interest of a given input image that includes the detected object. For example, the object data can include a bounding box or another bounding shape (e.g., a spheroid, an ellipsoid, a cylindrical shape, etc.) that corresponds to the region of interest of the given input image. In some embodiments, the object data can include other data associated with the detected object, such as an object class corresponding to the detected object, mask data associated with the detected object (e.g., a two-dimensional (2D) bit array that indicates pixels (or groups of pixels) that corresponds to the detected object), and so forth.

Server machine 150 may include an object tracking engine 151 configured to track a state of one or more objects detected in one or more images (e.g., generated by image source 104). For purposes of explanation, an object that is detected by object detection engine 141 is referred to herein as a detected object. An object that is tracked by object tracking engine 151 is referred to herein as a target object or a target. A state of a target, as provided herein, may correspond to a location of an object within an environment depicted by the one or more images, a position of the object within the environment, a scale or size of the object within the environment, a velocity of the object within the environment, and so forth.

In some embodiments, object tracking engine 151 may track a target based on an image including the target and object data (e.g., one or more bounding boxes) associated with the target. Object tracking engine 151 may instantiate an object tracker component (referred to as an object tracker herein) for each detected object in an image depicting the environment. An object tracker may be a logical component that is configured to maintain state data associated with a target within a set of images (e.g., a sequence of video frames) depicting the environment. For example, when an object is initially detected in an image (e.g., a video frame), object tracking engine 151 may instantiate an object tracker to monitor and determine a state associated with the detected object (referred to herein as a current state of the target). Object detection engine 141 may detect the target in other images depicting the environment (e.g., subsequent video frames) and the object tracker associated with the target may determine, for each of the other images, the current state of the target. The object tracker may update state data associated with the object to correspond to the determined current state and store the updated state data (e.g., at data store 112). In some embodiments, the object tracker may further estimate a future state of the target in the environment and may store an indication of the future state (e.g., at data store 112) with the updated state data. Further details regarding determining the current state of a target and estimating the future state of the target are provided herein.

In some embodiments, a target may become "lost" within an environment (i.e., object detection engine 141 and/or object tracking engine 151 may no longer detect a presence of the target in images depicting the environment). In one example, the target may move to a location within the environment that is not detectable by image source 104 (e.g., the target moves out of the environment depicted in images generated by image source 104). In another example, the target may undergo an occlusion event within the environment. As described above, an occlusion occurs when an object is obscured from the point of view of the camera (image source 104) by another object in the environment (e.g., one object walks behind one or more other objects from the perspective of the camera), which prevents object detection engine 141 and/or object tracking engine 151 from detecting or tracking the object being occluded. A partial occlusion (i.e., an object is partially occluded by another object) or a full occlusion (i.e., an object is fully occluded by another object) can occur when the target moves in front of or behind a static object or target or another moving object or target, relative to a position and/or location of image source 104. Responsive to determining that a particular target is lost (i.e., is no longer visible by the camera or image source 104) within an environment, the object tracker associated with the target may determine whether the lost target corresponds to another object that is detected in additional images depicting the environment. The additional images may be generated at a later time. Accordingly, there may be a period of time (e.g., one or more frames of a video) in which the tracked object is lost, after which tracking may again resume. If the lost object corresponds to another detected object, object tracking engine 151 may associate the "lost" target to the detected object and the object tracker may continue to track the target, as described herein. If the lost target does not correspond to another detected object, object tracking engine 151 may determine that the target is no longer present in the environment and, in such embodiments, may terminate the object tracker associated with the lost target. Further details about terminating a lost target and/or associating a lost target with another object detected in images depicting an environment are provided herein.

In some implementations, computing device 102, image source 104, data store 112, and/or server machines 130-150, may be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable object detection based on an image (e.g., image 106). It should be noted that in some other implementations, the functions of computing device 102, image source 104, server machines 130, 140, and/or 150 may be provided by a fewer number of machines. For example, in some implementations server machines 130, 140, and/or 150 may be integrated into a single machine, while in other implementations server machines 130, 140, and 150 may be integrated into multiple machines. In addition, in some implementations one or more of server machines 130, 140, and 150 may be integrated into computing device 102. For example, as illustrated in FIG. 1, image processing engine 131, object detection engine 141, and/or object tracking engine 151 may reside at on computing device 102, in some embodiments. In general, functions described in implementations as being performed by computing device 102 and/or server machines 130, 140, 150 may also be performed on one or more edge devices (not shown) and/or client devices (not shown), if appropriate. In addition, the functionality attributed to a particular component may be performed by different or multiple components operating together. Computing device 102 and/or server machines 130, 140, 150 may also be accessed as a service provided to other systems or devices through appropriate application programming interfaces.

Figure 2:
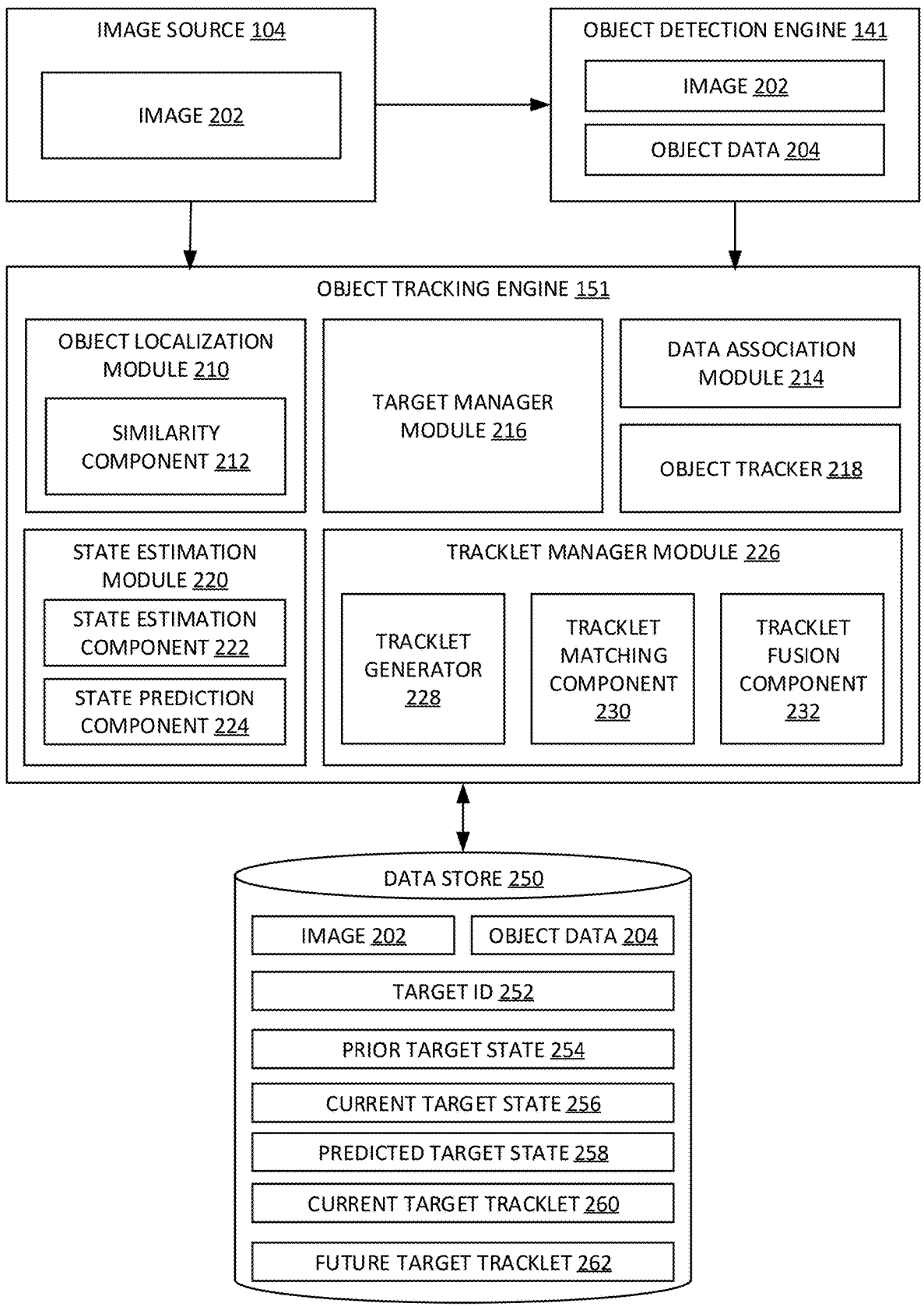
FIG. 2 is a block diagram of an image source, an object detection engine, and an object tracking engine, according to at least one embodiment, according to at least one embodiment.

FIG. 2 is a block diagram of an image source 104, an object detection engine 131 and an object tracking engine 151, according to at least one embodiment. As described with respect to FIG. 1, image source 104 may be or may include one or more sensors (e.g., image sensors, etc.) that are configured to generate data associated with an environment. For example, image source 104 may be, or may include, a camera component that is configured to generate a video stream (i.e., a sequence of video frames or image frames) depicting the environment over a period of time.

Image source 104 may generate an image 202, in accordance with previously described embodiments, and may provide the image 202 to object detection engine 141. In some embodiments, image source 104 may provide image 202 to image processing engine 131, as described with respect to FIG. 1. Image processing engine 131 may process image 202, in accordance with previously described embodiments, and provide image 202 to object detection engine 141. In response to obtaining image 202, object detection engine 141 may provide image 202 as input to a trained object detection model and obtain one or more outputs of the model that indicate object data 204 associated with one or more objects detected in image 202, as previously described. The trained object detection model may be, for example, an artificial neural network such as a convolutional neural network trained to identify one or more types of objects, such as cars, people, animals, and so on. In some embodiments, object data 204 may include a bounding box (or a bounding shape) that indicates a region of image 202 that includes a detected object. Image 202 and/or object data 204 may be stored at data store 250, in some embodiments. Data store 250 may correspond to data store 112, described with respect to FIG. 1, or may be different from data store 112.

Figure 3A:
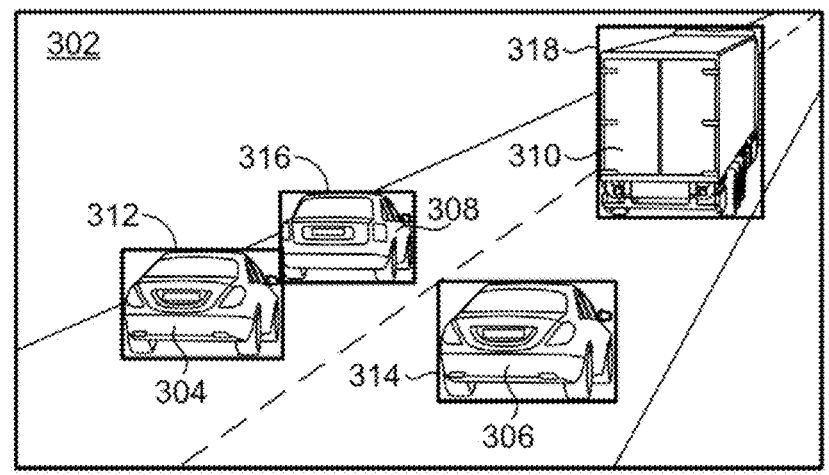
FIGS. 3A-C depict an example of tracking targets in an environment, according to at least one embodiment.
Figure 3B:
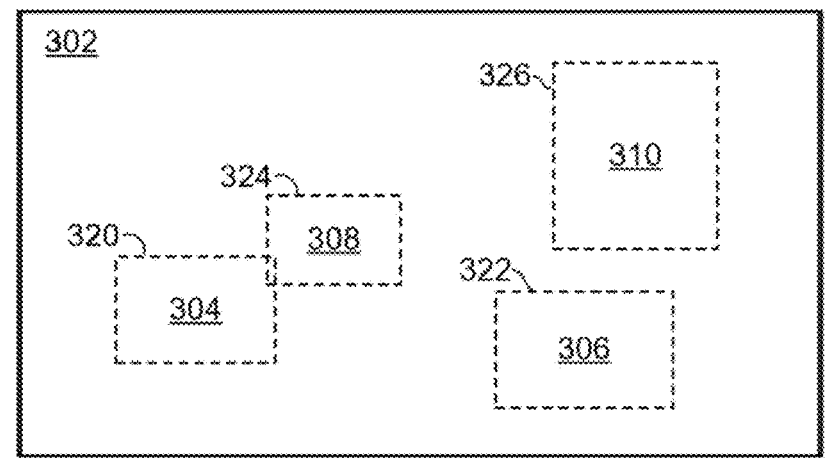
Figure 3C:
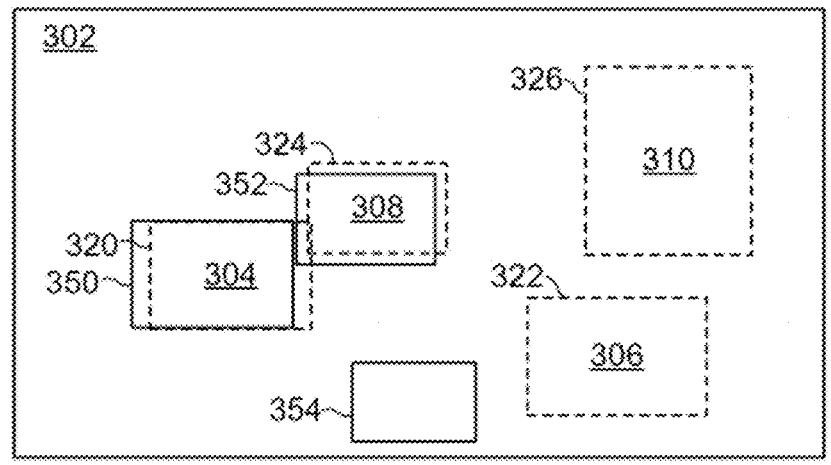

FIGS. 3A-3C depict example images 202A-202C generated by image source 104, according to at least one embodiment. As illustrated in FIG. 3A, image 202A depicts an example environment 302 including objects 304, 306, 308 and 310. In some embodiments, image 202A may be a first video frame of a sequence of video frames depicting environment 302. Object detection engine 131 may obtain image 202A and provide image 202A as input to a trained object detection model, as described above. One or more outputs of the object detection model may indicate regions of image 202A that include detected objects. The regions of image 202A indicated by the one or more outputs may correspond to a bounding box or other bounding shape associated with the detected objects. For example, a first region indicated by the one or more outputs may correspond to a first bounding box 312 associated with object 304, a second region may correspond to a second bounding box 314 associated with object 306, a third region may correspond to a third bounding box 316 associated with object 308 and a fourth region may correspond to a fourth bounding box 318 associated with object 310. Object data 204 generated for image 202A may include an indication of bounding boxes 312-318, in some embodiments.

Referring back to FIG. 2, object tracking engine 151 may obtain image 202 and/or object data 204 from object tracking engine 141, from image source 104, and/or via a data store, such as data store 112 described with respect to FIG. 1. As illustrated in FIG. 2, object tracking engine 151 may include an object localization module 210, a data association module 214, a target manager module 216, one or more object trackers 218, a state estimation module 220, and/or a tracklet manager module 226. Object localization module 210 may be configured to estimate a location of existing targets (referred to herein as localizing targets) tracked by object tracking engine 151 in a sequence of images 202 generated by image source 104.

In some embodiments, in response to obtaining object data 204, object localization module 210 may determine whether any object trackers 218 have been instantiated to track targets in the environment depicted in image 202. As described with respect to FIG. 3A, image 202A may be a first video frame of a sequence of video frames depicting environment 302. As image 202A may be the first video frame, object localization module 210 may determine that no object trackers 218 have been instantiated to track targets at the time object tracking module 151 obtains image 202A. In such embodiments, object localization module 210 may extract one or more visual features associated with each detected object (i.e., objects 304, 306, 308, 310) depicted in image 202A. The visual features may include an indication of one or more colors present in a set of pixels of a region of image 202A indicated by a bounding box (referred to herein as a bounding box region), a Histogram-of-Oriented-Gradient (HOG) of the bounding box region, or other visual features. Object localization module 210 may extract the visual features associated with the detected objects from the regions of image 202A indicated by bounding boxes 312, 314, 316, and 318.

The detected objects from different video frames may be compared to one another based on their visual features by similarity component 212. In some embodiments, similarity component 212 of object localization module 210 may generate a set of similarity metric values each indicating a similarity between a detected object 304, 306, 308, 310 from a current image or video frame and an existing target (e.g., associated with visual features extracted from one or more previous image or video frame). As described above, object localization module 210 may determine that no object trackers 218 have been instantiated for targets at the time image 202A is obtained, and therefore object tracking engine 151 may not be tracking any targets. Accordingly, similarity component 212 may assign each of the detected objects 304, 306, 308, 310 a particular similarity metric value (e.g., a low similarity metric value) which indicates that each of the detected objects 304, 306, 308, 310 do not correspond to an existing target.

Referring back to FIG. 2, in some embodiments, object detection engine 141 may not attempt to detect objects and generate object data 204 for each image 202 generated by image source 104 (e.g., in accordance with a protocol for the video analytics system). For example, object detection engine may be configured to detect objects in every other image 202 generated by image source 104, every few images 202 generated by image source 104, etc. In such embodiments, object localization module 210 may be configured to detect and localize one or more objects depicted in image

202 using a correlation filter. A correlation filter refers to a class of classifiers that are configured to produce peaks in correlation outputs or responses. In some embodiments, a peak in a correlation output or response can correspond to an object depicted in image 202. In some embodiments, a correlation filter can include at least one of a Kernelized Correlation Filter (KCF), a discriminative correlation filter (DCF), a Correlation Filter neural network (CFNN), a Multi-Channel Correlation Filter (MCCF), a Kernel Correlation Filter, an adaptive correlation filter, and/or other filter types. A correlation filter may be implemented using one or more machine learning models, such as a machine learning model that uses linear regression, logistic regression, decision trees, support vector machines (SVM), Naïve Bayes, K-nearest neighbor (KNN), K-means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

A correlation filter may be trained to produce or identify a peak correlation response at a region of an image that corresponds to a reference coordinate (e.g., a center) of an object depicted in the image. Object localization module 210 may obtain an image 202 (i.e., from image source 104 or via data store 250) and apply the correlation filter to image 202 to obtain one or more outputs. The one or more outputs of the correlation filter can indicate one or more peak locations of a correlation response for image 202 (referred to herein simply as a correlation response). The locations of one or more correlation responses may correspond to regions of image 202 that depict an object in the environment and, in some embodiments, the peak location of the correlation response may correspond to the reference coordinate (e.g., the center) of the depicted object. Object localization module 210 may identify the regions of image 202 that are associated with a respective correlation response as regions of image 202 that depict a respective object (referred to herein as a correlation response region). In some embodiments, similarity component 212 may extract features from a correlation response region and assign a similarity metric value to the respective object depicted in the correlation response region and existing targets tracked by object tracking engine 151, as described above and in further detail below.

In some embodiments, object localization module 210 may apply the correlation filter to an image 202 even if object detection engine 141 generates object data 204 associated with image 202. In such embodiments, object localization module 210 may use object data 204 and the output of the correlation filter to improve (i.e., re-train) the correlation filter for subsequent images (e.g., video frames) generated by image source 104. For example, object localization module 210 may identify the correlation response regions of image 202 based on one or more outputs of the correlation filter. Object localization module 210 may compare the correlation response at the respective correlation response regions of image 202 to each bounding box indicated by object data 204 and determine an accuracy of the respective correlation responses based on the comparison. In some embodiments, object localization module 210 may provide an indication of the correlation responses, the bounding boxes indicated by object data, and/or the determined accuracy of each respective correlation responses to re-train the correlation filter.

It should be noted that although some embodiments of the present disclosure are directed to localizing visual features of detected or depicted objects to the existing targets, other techniques may be used to localize the existing targets. For example, in response to obtaining object data 204 for image 202, object localization module 210 may extract one or more visual features from regions of image 202 indicated by bounding boxes of object data 204. Object localization module 210 may provide the extracted visual features as input to a machine learning model (e.g., a recurrent neural network, etc.) and obtain one or more outputs of the machine learning model. Object localization module 210 may extract, from the one or more obtained outputs, an identifier associated with one or more attributes of the extracted visual features. Object localization module 210 may compare the extracted identifier to identifiers associated with existing targets and provide an indication of the comparison to data association module 214, in some embodiments.

Object localization module 210 may provide an indication of the object data 204 associated with image 202 (e.g., the bounding box regions of image 202, correlation response regions of image 202, etc.) and the set of similarity metric values to data association module 214. Data association module 220 may be configured to determine whether a bounding box region and/or a correlation response region corresponds to an estimated location of an existing target (i.e., indicated by a future target state 258 for the target, as described below). In some embodiments, data association module 214 can compare a location of a respective bounding box region to a location of an estimated target location and determine, based on the comparison, whether the bounding box region is located within a threshold proximity of the estimated target location. In response to determining that the bounding box region is located within the threshold proximity of the estimated target location, data association module 214 may determine that bounding box region matches, or approximately matches, the region of image 202 that corresponds to the estimated target location. Such bounding box regions are referred to herein as matched bounding box regions. Responsive to determining that the bounding box region is located outside of the threshold proximity of the estimated target location, data association module 214 may determine that the bounding box region does not match the region of image 202. Such bounding box regions and estimated target locations are referred to herein as unmatched bounding box regions and unmatched estimated target locations, respectively.

In additional or alternative embodiments, data association module 214 may determine whether a bounding box region of image 202 corresponds to an estimated target location based on a similarity metric value associated with the detected object included in the bounding box region and a respective target (e.g., determined from one or more previous images). For example, in response to determining that a similarity metric value associated with a detected object and a respective target satisfy a similarity criterion (e.g., the similarity metric value meets or exceeds a threshold value), data association module 214 may determine that the bounding box region that includes the detected object matches or approximately matches the estimated target location (i.e., the bounding box region is a matched bounding box region). Responsive to determining that the similarity metric value does not satisfy the similarity criterion (e.g., the similarity metric falls below the threshold value), data association module 214 may determine that the bounding box region that includes the detected object does not match the estimated target location (i.e., the bounding box region and/or the estimated target location is an unmatched bounding box region and/or an unmatched estimated target location, respectively).

In some embodiments, data association module 214 may provide an indication of each unmatched bounding box region and unmatched estimated target location to target manager module 216, in some embodiments. Target manager module 316 may be configured to instantiate and/or terminate each object tracker 218 of object tracking engine 151. As indicated above, an object tracker refers to a logical component that is configured to track a state of a target included in a set of images (e.g., a sequence of video frames) depicting an environment. In response to receiving the indication of the unmatched bounding box regions and/or unmatched estimated target locations, target manager module 216 may determine whether to instantiate one or more new object trackers 218 (i.e., to create a new target) or terminate an instantiated object tracker 218 for an existing target (e.g., in accordance with a target termination policy). In an illustrative example, an unmatched bounding box region may indicate to the target manager module 216 that a new object has been detected in the surveilled environment. Accordingly, target manager module 216 may instantiate a new object tracker 218 to track the state of the detected object in image 202 and subsequent images (e.g., video frames) generated by image source 104. In some embodiments, target manager module 216 may instantiate a new object tracker 218 by assigning the target a target identifier (ID) and storing the target ID at data store 250 as target ID 252. In another illustrative example, an unmatched estimated target location may indicate to target manager module 216 that a target is no longer present in the environment surveilled by image source 104. In response to determining that the target satisfies one or more conditions of a target termination policy, target manager module 216 may terminate an object tracker 218 that was instantiated to track the state of the target. In some embodiments, target manager module 216 may terminate the object tracker 218 by removing the target ID 252 for the terminated target from data store 250 and/or recycling the target ID 252 of the terminated target to be used for a new target.

As indicated previously with respect to FIG. 3A, image 202A may be the first video frame in a sequence of video frames generated by image source 104 and no object trackers 218 may be instantiated for any targets in environment 302 at the time image 202A is generated. Data association module 214 may identify each bounding box 312, 314, 316, 318 as unmatched bounding box regions and accordingly, target manager module 216 may instantiate a respective object tracker 218 for each of objects 304, 306, 308, and 310, in accordance with previously described embodiments.

Referring back to FIG. 2, an object tracker 218 may be configured to track a state of a respective target in an environment. A target state may refer to a location, a position, a scale or size, a velocity, etc. associated with a target during a time period that an image 202 is generated. An object tracker 218 associated with a respective target may determine one or more target states (e.g., a prior target state 254, a current target state 256, a predicted target state 258, etc.) based on state estimations and/or predictions made by state estimation module 220. As illustrated in FIG. 2, state estimation module 220 may include a state estimation component 222 and a state prediction component 224. State estimation component 222 may be configured to determine a current target state 256 based on state data associated with a target at the time an image 202 depicting the target is generated. For example, a current target state 256 may be defined by one or more coordinates for a bounding box associated with the target in image 202, a size of the bounding box associated with the target, and/or a change in the one or more coordinates for the bounding box relative to prior coordinates of a bounding box associated with the target in one or more prior images depicting a surveilled or monitored environment. In another example, the current target state 256 may be further defined by a change in the size of the bounding box associated with the target relative to a bounding box associated with the target in the one or more prior images. In some embodiments, the current target state 256 may also include one or more target features (e.g., extracted from the bounding box region of image 202, extracted from a correlation response region of image 202, etc.).

In some embodiments, state estimation component 222 may determine a current target state based on data obtained for the target from image 202. For example, an object tracker 218, data association module 214 and/or object localization module 210 may provide an indication of one or more bounding boxes associated with the target to state estimation component 222, in some embodiments. State estimation component 222 may determine the coordinates of the one or more bounding boxes and/or the size of the one or more bounding boxes based on the provided data. In some embodiments, state estimation component 222 may determine whether the target is a new target in image 202 or the target is an existing target that was tracked before image 202 was generated. In response to determining that the target was an existing target, state estimation component 222 may obtain prior target state data 254 for the target (e.g., from data store 250). Prior target state data 254 refers to target state data that as estimated (e.g., by state estimation component 222) for a target based on images generated prior to image 202. State estimation component 222 may determine the change in the one or more coordinates for the bounding box associated with the target by determining a distance between the one or more coordinates of the bounding box associated with image 202 and coordinates of a bounding box associated with the target depicted in one or more prior images. State estimation component 222 may determine a speed and direction (i.e., a velocity) at which the target is moving based on the determined distance. In some embodiments, state estimation component 222 may further determine a change in the size or scale of the target based on the determined distance.

As indicated above, the change in the one or more coordinates for the bounding box associated with the target depends on the location of a bounding box for an image generated prior to image 202. Accordingly, if a target is a new target in image 202, state estimation component 222 may not determine the change in the location and/or size or scale of the target (i.e., as no prior images generated by image source 104 depict the target). If the target is depicted in subsequent images of the surveilled environment, state estimation component 222 may determine the velocity and/or size or scale change of the target when the subsequent images are generated, in accordance with previously described embodiments.

It should be noted that in some embodiments described below, object localization module 210 may identify one or more correlation response regions of image 202 (e.g., using a correlation response filter, etc.). In such embodiments, state estimation component 222 may determine the current state of the target based on the identified correlation response regions in addition to or in lieu of the bounding box regions of image 202.

State estimation component 222 may store the coordinates of the one or more bounding boxes, the coordinates of one or more correlation response regions, the size of the one or more bounding boxes and/or the correlation response region, the velocity of the target, and/or the change in size or scale of the target as current target state 256 in data store 250. In some embodiments, state prediction component 224 may be configured to predict a future state of the target in the environment based on the current target state 256 for the target. In some embodiments, state prediction component 224 may obtain the current target state 256 and provide the current state 256 as an input to one or more state prediction functions. A state prediction function may be configured to execute a recursive filter, such as a Kalman Filter (KF), to estimate a future state of a target in the environment. State prediction component 224 may obtain an output from the one or more state prediction functions and determine, based on the output, a future state of the target during a time that is subsequent to when image 202 is generated, in some embodiments. In other or similar embodiments, state prediction component 224 may determine multiple future states of the target during a time period that is subsequent to when image 202 is generated. For example, state prediction component 224 may determine, based on the output of the one or more state prediction functions, a future state of the target at each instance of time of a time period that is subsequent to when image 202 is generated. State prediction component 224 may store the one or more future states of the target at data store 250 as future target state 258.

In additional or alternative embodiments, state prediction component 224 may use one or more machine learning models to predict the future state of the target. The one or more machine learning models may include a long term short term memory (LSTM) model, or another type of recurrent neural network (RNN) model. In some embodiments, the one or more machine learning models may be trained using historical object data and/or historical target state data to predict a future state of a target based on given target state and/or object data. State prediction component 224 may provide object data 204, the prior target state 254 and/or the current target state 256 for a target as input to the one or more machine learning models and may obtain an output of the one or more models. State prediction component 224 may extract, from the one or more outputs, multiple sets of state data for the target. Each set of target state data may correspond to a future state of the target at an instance of time that is subsequent to when image 202 is generated. In some embodiments, state prediction component 224 may also extract an indication of a level of confidence that a respective set of state data corresponds to the target. State prediction component 224 may identify one or more sets of state data associated with a level of confidence that satisfies a level of confidence criterion. For example, state prediction component 224 may identify a set of state data that is associated with the higher level of confidence than other sets of state data extracted from the one or more outputs. In another example, state prediction component 224 may identify each set of state data associated with a level of confidence that meets or exceeds a threshold level of confidence. Responsive to identifying the one or more sets of state data, state prediction component 224 may store the one or more sets of state data as predicted target state 258 at data store 250, as described above.

As described above, target manager module 216 may instantiate a new object tracker 218 to track a state of a newly detected object in image 202 (e.g., in view of an unmatched bounding box determined for image 202). However, in some embodiments, the newly instantiated object tracker 218 may not be configured to begin tracking the target until the target has been detected (e.g., by object detection engine 141 and/or object localization module 210) for a threshold number of images 202 generated by image source 104. In an illustrative example, target manager module 216 may instantiate an object tracker 218 to track an object that is first detected in a first video frame. However, the object tracker 218 for the target may not obtain and/or provide state data associated with the target based on first video frame (i.e., the object tracker 218 may not be tracking the state of the target based on the first video frame). If the target is detected (e.g., by object detection engine 141 and/or object localization module 210) in a threshold number of subsequent video frames, the object tracker 218 may be configured to obtain state data for the target and provide the state data to state estimation module 220, in accordance with embodiments described above. The technique of delaying tracking of a target until the target is detected in a threshold number of images 202 generated by image source 104 is referred to herein as late object tracker activation or simply late activation.

FIG. 3B depicts one or more estimated locations of targets 304, 306, 308, 310 in environment 302 at a time period after image 202A is generated. The estimated locations of targets 304, 306, 308, 310 may correspond to a predicted target state 258 associated with each target, as determined by state prediction component 224, in accordance with previously described embodiments. As illustrated in FIG. 3B, state prediction component 224 can predict that target 304 may be present at location 320 of environment 302, target 306 may be present at location 322 of environment 302, target 308 may be present at location 324 of environment 302, and target 310 may be present at location 326 of environment 302 in a future image or video frame. In some embodiments, object localization module 210 may localize targets 304, 306, 308, 310 based on the estimated locations 320, 322, 324, 326 (e.g., if object detection engine 141 does not generated object data 204 associated with an image generated after image 202A, as described above).

FIG. 3C illustrates another image 202B depicting example environment 302. In some embodiments, image 202B may be a video frame that is subsequent to the first video frame (i.e., image 202A) of the sequence of video frames depicting environment 302. Object detection engine 141 may generate object data 204 for one or more objects detected in image 202B. As illustrated in FIG. 3C, object data 204 may include bounding boxes 350, 352, and 354. Object localization module 210 may obtain image 202A and the corresponding object data 204, as described above, and initiate one or more processes to localize existing targets (e.g., targets 304, 306, 308, 310) in image 202B. In some embodiments, object localization module 210 may obtain predicted state data 258 associated with each respective target (e.g., from data store 250) and may estimate a location of each respective target in image 202B based on the obtained predicted state data 258. In accordance with embodiments described with respect to FIG. 3B, object localization module 210 may estimate that target 304 is present at location 320, target 306 is present at location 322, target 308 is present at location 324, and target 310 is present at location 326 of environment 302 depicted in image 202B.

Similarity component 212 may extract visual features from the bounding box regions of image 202B and the correlation response regions of image 202B that correspond to the estimated locations 320, 322, 324, 326 of each respective target (referred to herein as an estimated target region). Similarity component 212 may compare the extracted visual features of the detected objects in image 202B with visual features associated with tracked objects. Similarly component 212 may determine a similarity metric value associated with the extracted visual features based on the comparison, and may provide an indication of the bounding box regions, the estimate target regions, and the determined similarity metric values to data association module 214, as previously described. In accordance with previously described embodiments and examples, data association module 214 may determine that bounding box 350 matches with estimated location 320 and bounding box 352 matches with estimated location 352 based on the similarity values satisfying one or more similarity criteria (e.g., a difference being less than a difference threshold). Accordingly, object trackers 218 associated with targets 304 and 308 may provide state data associated with targets 304 and 308 to state estimation module 220 to update the current states of targets 304 and 308 in view of image 202B. For example, state estimation component 222 may determine a new state associated with targets 304 and 308 in view of image 202B and may update the current target state 256 for each target based on the determined new state. State estimation component 222 may store the state determined for targets 304 and 308 with respect to image 202A as prior state data 254 and may store the updated current target state 256 at data store 250, as described above. In some embodiments, state prediction component 224 may predict a future location of targets 304 and 308 in environment 302 update the future target states 258 in view of the predicted future locations.

In some embodiments, data association module 214 may determine that bounding box 354 does not match with an estimated location associated with an existing target in environment 302. Accordingly, target manager module 216 may determine that bounding box 354 corresponds to a new detected object in the environment and may instantiate an object tracker 218 to track the detected object. In additional or alternative embodiments, data association module 214 may determine estimated locations 322 and 326 do not match with a bounding box of object data 204 (i.e., estimated locations 322 and 326 are unmatched estimated locations). Accordingly, target manager module 216 may determine to terminate object trackers associated with 310 and/or 306, in accordance with a target management policy and/or embodiments described herein.

As indicated above, target manager module 216 may be configured to terminate an object tracker 218 for a target if the target is determined to be "lost," in accordance with a target termination policy of the video analytics system. In some embodiments, the target termination policy may provide that target manager module 216 may not terminate an object tracker 218 until the target associated with the object tracker is "lost" for a threshold number of images generated by image source 104. In such embodiments, the object tracker 218 may continue to track the target based on the predicted target state 258 determined for the target (e.g., based on the most recent current object state 256 determined for the target). In an illustrative example, if a target is tracked based on one or more video frames, in accordance with previously described embodiments, and is determined to be "lost" in a subsequent video frame, the object tracker 218 associated with the target may continue to track the target, even though the target is "lost" in the subsequent video frame. If object detection engine 141 and/or object localization module 210 does not detect the "lost" target in a threshold number of subsequent video frames, the target manager module 216 may terminate the object tracker 218 associated with the target, in accordance with the target termination policy. The technique of tracking a target in an environment even though the target is not detected (e.g., by object detection engine 141 and/or object localization module 210) is referred to herein as shadow tracking.

Figure 5A:
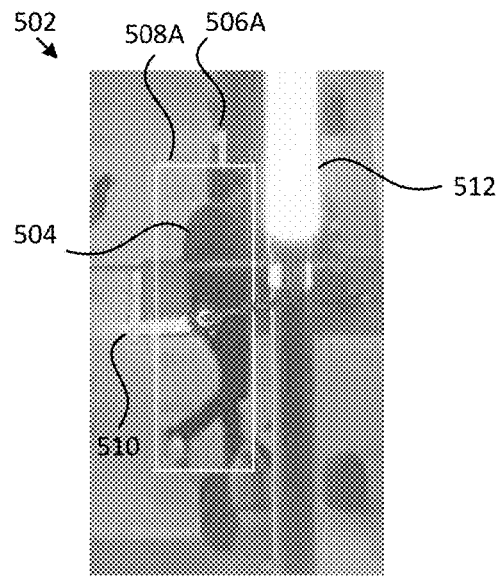
FIGS. 5A-D depict an example of associating a new object detected in an environment with a lost object tracked by an intelligent video analytics system, according to at least one embodiment.
Figure 5B:
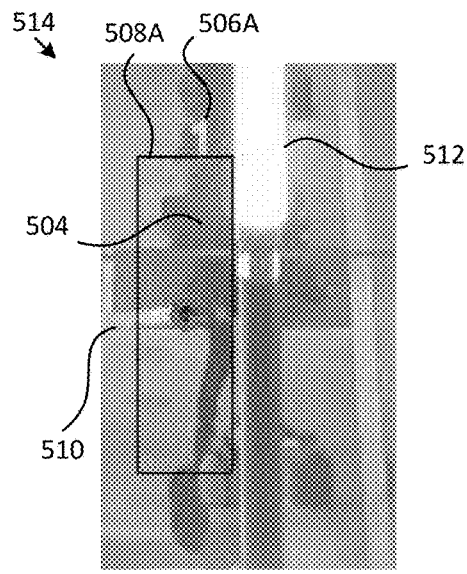
Figure 5C:
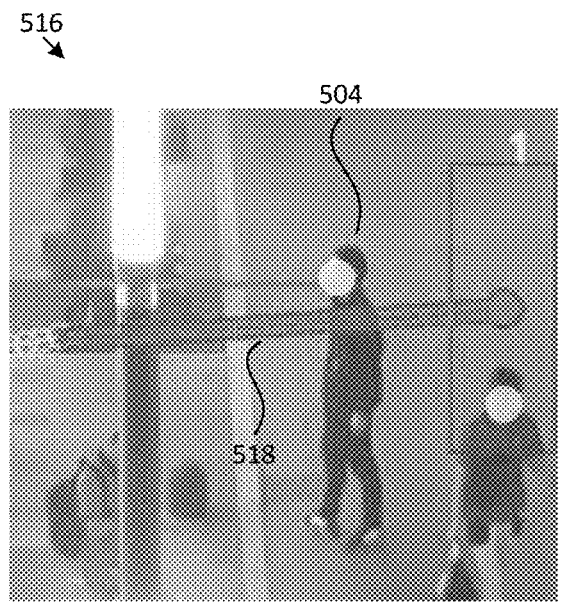

Tracklet manager module 226 may be configured to generate and maintain one or more tracklets associated with targets tracked by object tracking engine 151. A tracklet refers to a set of coordinates that indicates a path that is predicted to be taken by a target in a surveilled environment. Tracklet generator 228 may be configured to generate a tracklet for a target based on a prior target state 254, a current target state 256, and/or a predicted target state 258 associated with the target. In some embodiments, tracklet generator 228 may use a prior target state 254 and/or a current target state 256 for a target to generate a tracklet that indicates a prior and/or current path that the target has taken. Tracklet generator 228 may store such tracklet as a current target tracklet 260 at data store 250. In additional or alternative embodiments, tracklet generator 228 may use a prior target state 254, a current target state 256, and/or a predicted target state 258 associated with the target to generate a tracklet that indicates a predicted or future path that the target is expected to take. Tracklet generator 228 may store such tracklet as a predicted target tracklet 262 at data store 250. FIGS. 5A-5C illustrate a current target tracklet 260 and a predicted target tracklet 262 associated with a target tracked by object tracking engine 151, as described in further detail herein. In some embodiments, tracklet generator 228 may generate predicted target tracklets 262 for all targets tracked by object tracking engine 151. In other or similar embodiments, tracklet generator may be configured to generate predicted target tracklets 262 for lost targets before object trackers 218 associated with the lost tracklets are terminated (i.e., in accordance with the shadow tracking technique described above).

In some additional embodiments, tracklet generator 228 may also be configured to generate a tracklet for new targets that are associated with an object tracker 218 that is not yet configured to track the target (i.e., an object tracker 218 that has not yet been activated in accordance with the late activation technique described above). In some embodiments, tracklet generator 228 may obtain state data associated with the new target (e.g., from object localization module 210, from data association module 214, etc.). In some embodiments, tracklet generator 228 may determine a current state associated with the new target based on the obtained state data and may update a tracklet associated with the new target based on the determined current state. In other or similar embodiments, tracklet generator 228 may provide the current state to state estimation component 222, which may determine the current target state 256, as described above. Tracklet generator 228 may update the tracklet associated with the target based on the current target state 256, as described above.

Tracklet matching component 230 may be configured to identify matching tracklets (e.g., in data store 250). For example, as indicated above, tracklet generator 228 may generate a predicted target tracklet 262 for a lost target that is tracked according to the shadow tracking technique. Tracklet generator 228 may also generate a current target tracklet 260 for a new target that is not yet being tracked by an object tracker 218, in accordance with the late activation technique. In some embodiments, tracklet matching component 230 may compare current target tracklets 260 for new targets to predicted target tracklets 262 for lost targets and determine whether a current target tracklet 260 for a new target corresponds to a predicted target tracklet 262 (i.e., whether the new target is the same object as the lost target) based on the comparison. In response to tracklet matching component 230 determining that a current target tracklet 260 for a new target corresponds to a predicted target tracklet 262 (i.e., the lost target is now a found target), tracklet fusion component 234 may associate an identifier associated with the new target to correspond to an identifier for the lost target (i.e., to "fuse" or "merge" the current target tracklet 260 with the predicted target tracklet 262). The object tracker 218 associated with the lost target may continue to track the object (i.e., the found target), in accordance with previously described embodiments. In some embodiments, target manager module 216 may terminate the object tracker 218 that was instantiated for the new object. Further details about identifying and fusing matching tracklets are provided in further details below.

Real-Time Persistent Object Tracking

FIG. 4 illustrates a flow diagram of an example method 400 of managing lost objects tracked by a video analytics system, according to at least one embodiment. In at least one embodiment, method 400 may be performed by client device 102, server machine 130, server machine 140, and/or server machine 150. For example, one or more operations of method 400 may be performed by one or more components or modules of image processing engine 131, object detection engine 141, and/or object tracking engine 151. Method 400 may be performed by one or more processing units (e.g., CPUs and/or GPUs), which may include (or communicate with) one or more memory devices. In at least one embodiment, method 400 may be performed by multiple processing threads (e.g., CPU threads and/or GPU threads), each thread executing one or more individual functions, routines, subroutines, or operations of the method. In at least one embodiment, processing threads implementing method 400 may be synchronized (e.g., using semaphores, critical sections, and/or other thread synchronization mechanisms). Alternatively, processing threads implementing method 400 may be executed asynchronously with respect to each other. Various operations of method 400 may be performed in a different order compared with the order shown in FIG. 4. Some operations of the methods may be performed concurrently with other operations. In at least one embodiment, one or more operations shown in FIG. 4 may not always be performed.

Processing units performing method 400 may track, at block 410, a state of a first object included in an environment based on a first set of images depicting the environment during a first time period. In some embodiments, the first set of images may be a sequence of images 202 generated by image source 104, as described with respect to FIGS. 1 and 2. Object tracking engine 151 may track the state of the first object, in accordance with previously described embodiments. FIG. 5A depicts an example image 502 depicting an environment and an object 504 included in the environment. Image 502 may correspond to the first set of images generated during the first time period. In some embodiments, object 504 may be tracked by object tracking engine 151. In such embodiments, target manager module 216 of object tracking engine 151 may instantiate an object tracker 218 to track a state of object 504 (also referred to herein as target 504). Object tracker 218 may assign a tracker identifier 506A to target 504. In an illustrative example, object tracker 218 may assign a tracker identifier 506A of "1" to target 504. In some embodiments, object detection engine 141 may generate object data 204 associated with target 504, such as bounding box 508A. Tracklet generator 228 may generate a current target tracklet 260 associated with target 504, in accordance with previously described embodiments. Current target tracklet 260 is depicted in FIG. 5A as tracklet 510. As further illustrated in FIG. 5A, target 504 may be moving towards object 512 (e.g., a lamp post), relative to a position or location of image source 104 that generated image 502.

Referring back to FIG. 4, at block 412, processing units performing method 400 may determine that the first object is not detected in the environment depicted in a second set of images generated during a second time period. FIG. 5B depicts another example image 514 generated by image source 104. Image 514 may correspond to a second set of images generated during a second time period. As illustrated in FIG. 5B, target 504 may undergo an occlusion event with object 512. In some embodiments, object detection engine 141 and/or object localization module 210 may not detect target 504 due to the occlusion event. Accordingly, target manager module 216 may determine that target 504 is a lost target and may continue to track target 504 based on a shadow tracking technique, as described above.

Referring back to FIG. 4, at block 414, processing units performing method 400 may obtain one or more future states of the first object in view of the state of the first object in the environment depicted in the first set of images. The one or more future states of the first object (e.g., target 504) may correspond to a future target tracklet 262 generated by tracklet generator 228. As described above, tracklet generator 228 may generate predicted target tracklet 262 based on prior target state 254, current target state 256, and/or predicted target state 258 associated with target 504. FIG. 5C depicts another example image 516 generated by image source 104. The predicted target tracklet 262 may be depicted in FIG. 5C as tracklet 518. As illustrated in FIG. 5C, tracklet 518 begins at approximately the location at which object detection engine 141 and/or object localization module 210 did not detect target 504 in image 514. Tracklet 518 may correspond to a set of coordinates of image 514 for a path that target 504 is expected to follow in the environment (e.g., in view of the prior target state 254, current target state 256, and/or predicted target state 258 associated with target 504).

Figure 5D:
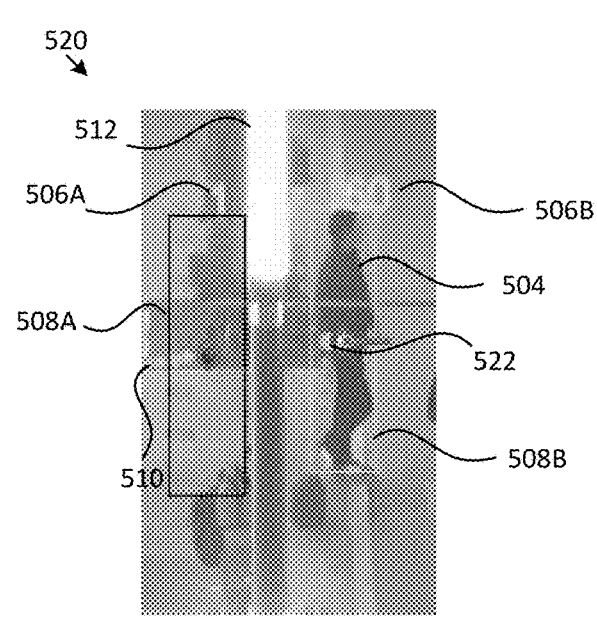

Referring back to FIG. 4, at block 416, processing units performing method 400 may detect a second object included in the environment based on a third set of images generated during a third time period. FIG. 5D depicts another example image 520 generated by image source 104. Image 520 may correspond to a third set of images generated during a third time period. As illustrated in FIG. 5D, target 504 may reappear in the environment (e.g., after moving from behind object 512). Object detection engine 141 and/or object localization module 210 may detect target 504 as a new object in the environment. In some embodiments, object detection engine 141 may generate object data 204 associated with the new object, such as bounding box 508B. Tracker manager module 216 may instantiate an object tracker 218 to track the new object, as described above. As illustrated in FIG. 5D, object tracker 218 may assign the new object a target ID 506B of "60." In some embodiments, target manager module 216 may not yet activate the object tracker 218 for the new object, in accordance with the late activation technique described above. Tracklet generator 228 may generate a current target tracklet 260 for the new object, as described above. The current target tracklet 260 for the new object may be depicted in FIG. 5D as tracklet 522.

Referring back to FIG. 4, in some embodiments, processing units performing method 400 may determine whether a current state of the second object corresponds to at least one of the one or more future states of the first object. For example tracklet matching component 230 of tracklet manager module 226 may compare tracklet 522 to predicted target tracklets 262 for lost targets (e.g., stored in data store 250). In some embodiments, tracklet manager module 226 may identify one or more predicted target tracklets 262 that were lost during a time period that is the same or similar to a time period that the new object was detected in image 520 and compare tracklet 522 to the identified tracklets 262. In other or similar embodiments, tracklet manager module 226 may identify one or more predicted target tracklets 262 that were lost at a location that is within a threshold proximity of a location that the new object was detected in 520 and compare tracklet 522 to the identified tracklets 262.

In some embodiments, tracklet matching component 230 may compare tracklet 522 and each of the identified tracklets 262 by performing a time series analysis (e.g., a dynamic time warping analysis) to tracklet 522 and each respective identified tracklet 262. To perform the time series analysis, tracklet matching component 230 may compare each coordinate of tracklet 522 to one or more coordinates of a respective tracklet 262 and determine whether a coordinate of tracklet 522 corresponds to (i.e., matches or approximately matches) a coordinate of the respective tracklet 262. In response to determining that a coordinate of tracklet 522 corresponds to a coordinate of the respective tracklet 262, tracklet matching component 230 may determine that tracklet 522 corresponds to the respective tracklet 262, and therefore that the new object corresponds to the lost target associated with the respective tracklet 262.

In some embodiments, tracklet matching component 230 may determine that tracklet 522 corresponds to multiple tracklets 262 associated with lost targets (i.e., multiple lost targets may correspond to the new object). In such embodiments, tracklet matching component 230 may compare other attributes associated with the new object and the multiple lost targets to identify a single lost target that corresponds to the new object. For example, tracklet matching component 230 may determine a difference between a size of a most recent bounding box or a correlation response determined for a lost target and a size of a bounding box or a correlation response determined for the new object. Responsive to determining that the difference satisfies a difference criterion (i.e., the difference falls below a difference threshold value), tracklet matching component 230 may determine that the lost target corresponds to the new object. Tracklet matching component 230 may consider different attributes associated with the new object and the lost target (i.e., as determined before the target was lost) to identify a lost target that corresponds to the new object. Such attributes may include an angle or direction of the new object and/or the lost target, a speed of the new object and/or the lost target, an average intersection-over-union rating associated with a bounding box for the new object and a bounding box for the lost target, and so forth.

At block 418, processing units performing method 400 may determine that the current state of the second object corresponds to at least one of the one or more future states of the first object. Tracklet matching component 230 may determine that a tracklet 262 associated with a lost target (i.e., the first object) corresponds to tracklet 522 associated with the new object (i.e., the second object), in accordance with previously described embodiments. Accordingly, tracklet matching component 230 may determine that the current location of the new object, as indicated by one or more coordinates of tracklet 522, corresponds to a future state of the lost target, as indicated by one or more coordinates of tracklet 262.

At block 420, processing units performing method 400 may update an identifier associated with the second object to correspond to an identifier associated with the first object. Tracklet fusion component 232 may update a target identifier 506B associated with the new object to correspond to the target identifier 506A associated with target 504. In accordance with the previous illustrative example, responsive to determining that tracklet 522 corresponds to tracklet 518 (i.e., associated with target 504), tracklet fusion component 232 may update identifier "60" for the new object to correspond to identifier "1" for target 504. Tracklet fusion component 232 may also "fuse" or "merge" tracklet 522 to tracklet 518. For example, tracklet fusion component 232 may identify a location of the environment depicted in images 502, 514, 516, 520 where target 504 was last detected (e.g., by object detection engine 141 and/or object localization module 210) and determine one or more coordinates for the identified location. Tracklet fusion component 232 may also determine a coordinate of tracklet 522 that corresponds to a current state of the new object in image 520 (e.g., the last coordinate of tracklet 522). In some embodiments, tracklet fusion component 232 may perform a linear interpolation based on the coordinates for the location where target 504 was last detected and the coordinate of tracklet 522 that corresponds the current state of the new object to determine a path taken by target 504 when target 504 was not detected. Tracklet fusion component 232 may provide the determined path to the object tracker 218 associated with target 504 and the object tracker 218 may provide data associated with the determined path to state estimation module 220. State estimation module 220 may update a prior target state 254, a current target state 256, and/or a future target state 258 associated with target 504 based on the provided data. Object tracker 218 may continue to track target 504, in accordance with embodiments described herein. In some embodiments, target manager module 216 may terminate the object tracker 218 that was instantiated to track the new object, in accordance with previously described embodiments.

Figure 6A:
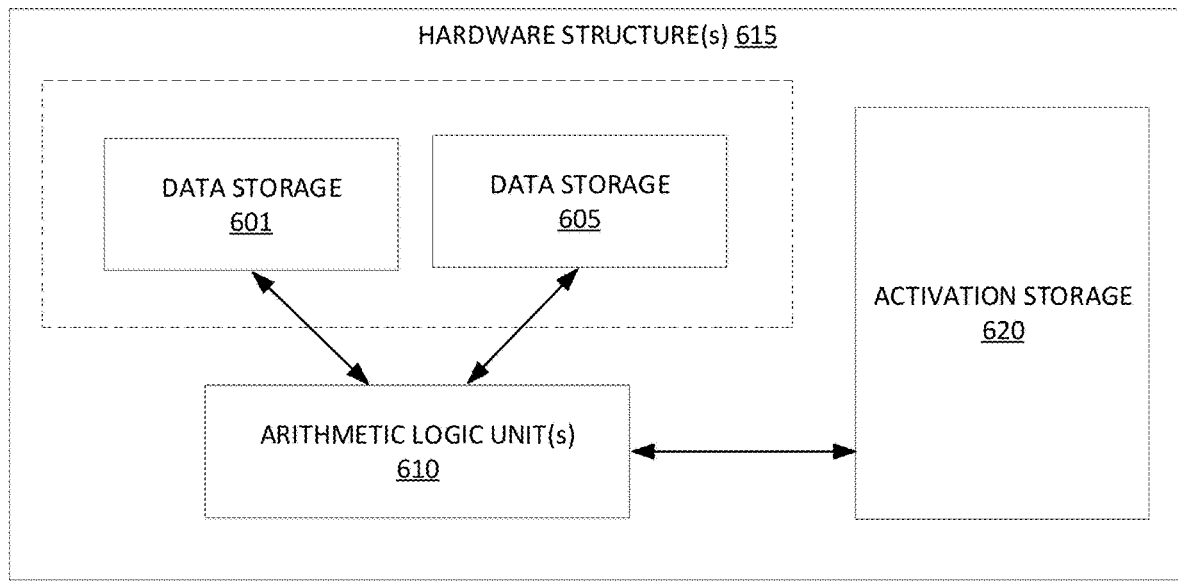
FIG. 6A illustrates inference and/or training logic, according to at least one embodiment.

FIG. 6A illustrates inference and/or training logic 615 used to perform inferencing and/or training operations associated with one or more embodiments. Details regarding inference and/or training logic 615 are provided below in conjunction with FIGS. 6A and/or 6B.

In at least one embodiment, inference and/or training logic 615 may include, without limitation, code and/or data storage 601 to store forward and/or output weight and/or input/output data, and/or other parameters to configure neurons or layers of a neural network trained and/or used for inferencing in aspects of one or more embodiments. In at least one embodiment, training logic 615 may include, or be coupled to code and/or data storage 601 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 601 may be included with other on-chip or off-chip data storage, including a processor's L1, L2, or L3 cache or system memory.

In at least one embodiment, any portion of code and/or data storage 601 may be internal or external to one or more processors or other hardware logic devices or circuits. In at least one embodiment, code and/or code and/or data storage 601 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 601 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 615 may include, without limitation, a code and/or data storage 605 to store backward and/or output weight and/or input/output data corresponding to neurons or layers of a neural network trained and/or used for inferencing in aspects of one or more embodiments. In at least one embodiment, code and/or data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 615 may include, or be coupled to code and/or data storage 605 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 605 may be included with other on-chip or off-chip data storage, including a processor's L1, L2, or L3 cache or system memory. In at least one embodiment, any portion of code and/or data storage 605 may be internal or external to on one or more processors or other hardware logic devices or circuits. In at least one embodiment, code and/or data storage 605 may be cache memory, DRAM, SRAM, non-volatile memory (e.g., Flash memory), or other storage. In at least one embodiment, choice of whether code and/or data storage 605 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 601 and code and/or data storage 605 may be separate storage structures. In at least one embodiment, code and/or data storage 601 and code and/or data storage 605 may be same storage structure. In at least one embodiment, code and/or data storage 601 and code and/or data storage 605 may be partially same storage structure and partially separate storage structures. In at least one embodiment, any portion of code and/or data storage 601 and code and/or data storage 605 may be included with other on-chip or off-chip data storage, including a processor's L1, L2, or L3 cache or system memory.

In at least one embodiment, inference and/or training logic 615 may include, without limitation, one or more arithmetic logic unit(s) ("ALU(s)") 610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 620 that are functions of input/output and/or weight parameter data stored in code and/or data storage 601 and/or code and/or data storage 605. In at least one embodiment, activations stored in activation storage 620 are generated according to linear algebraic and or matrix-based mathematics performed by ALU(s) 610 in response to performing instructions or other code, wherein weight values stored in code and/or data storage 605 and/or code and/or data storage 601 are used as operands along with other values, such as bias values, gradient information, momentum values, or other parameters or hyperparameters, any or all of which may be stored in code and/or data storage 605 or code and/or data storage 601 or another storage on or off-chip.

In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 601, code and/or data storage 605, and activation storage 620 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., Flash memory), or other storage. In at least one embodiment, activation storage 620 may be completely or partially within or external to one or more processors or other logical circuits. In at least one embodiment, choice of whether activation storage 620 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 615 illustrated in FIG. 6A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6A may be used in conjunction with central processing unit ("CPU") hardware, graphics processing unit ("GPU") hardware or other hardware, such as data processing unit ("DPU") hardware, or field programmable gate arrays ("FPGAs").

Figure 6B:
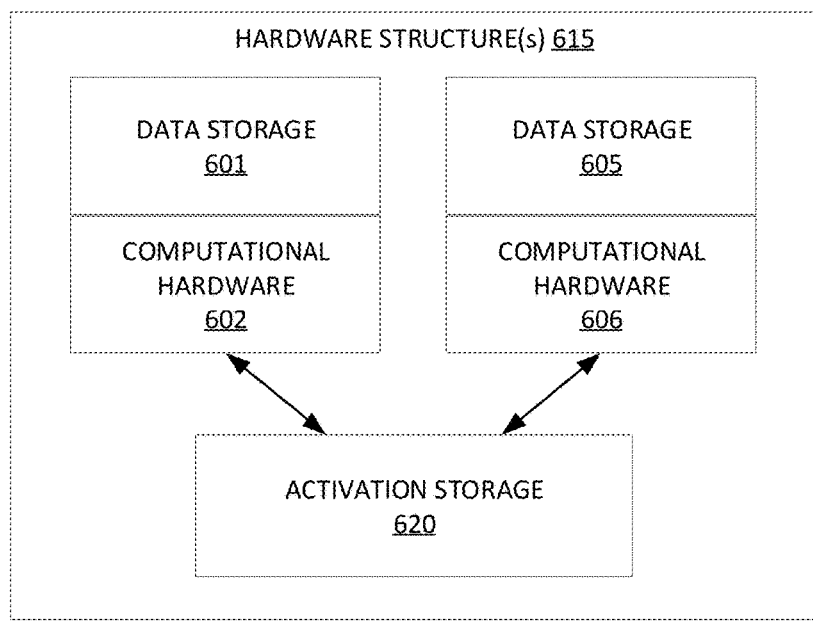
FIG. 6B illustrates inference and/or training logic, according to at least one embodiment.

FIG. 6B illustrates inference and/or training logic 615, according to at least one or more embodiments. In at least one embodiment, inference and/or training logic 615 may include, without limitation, hardware logic in which computational resources are dedicated or otherwise exclusively used in conjunction with weight values or other information corresponding to one or more layers of neurons within a neural network. In at least one embodiment, inference and/or training logic 615 illustrated in FIG. 6B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 615 includes, without limitation, code and/or data storage 601 and code and/or data storage 605, which may be used to store code (e.g., graph code), weight values and/or other information, including bias values, gradient information, momentum values, and/or other parameter or hyperparameter information. In at least one embodiment illustrated in FIG. 6B, each of code and/or data storage 601 and code and/or data storage 605 is associated with a dedicated computational resource, such as computational hardware 602 and computational hardware 606, respectively. In at least one embodiment, each of computational hardware 602 and computational hardware 606 comprises one or more ALUs that perform mathematical functions, such as linear algebraic functions, only on information stored in code and/or data storage 601 and code and/or data storage 605, respectively, result of which is stored in activation storage 620.

In at least one embodiment, each of code and/or data storage 601 and 605 and corresponding computational hardware 602 and 606, respectively, correspond to different layers of a neural network, such that resulting activation from one "storage/computational pair 601/602" of code and/or data storage 601 and computational hardware 602 is provided as an input to "storage/computational pair 605/606" of code and/or data storage 605 and computational hardware 606, in order to mirror conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage computation pairs 601/602 and 605/606 may be included in inference and/or training logic 615.

Data Center

Figure 7:
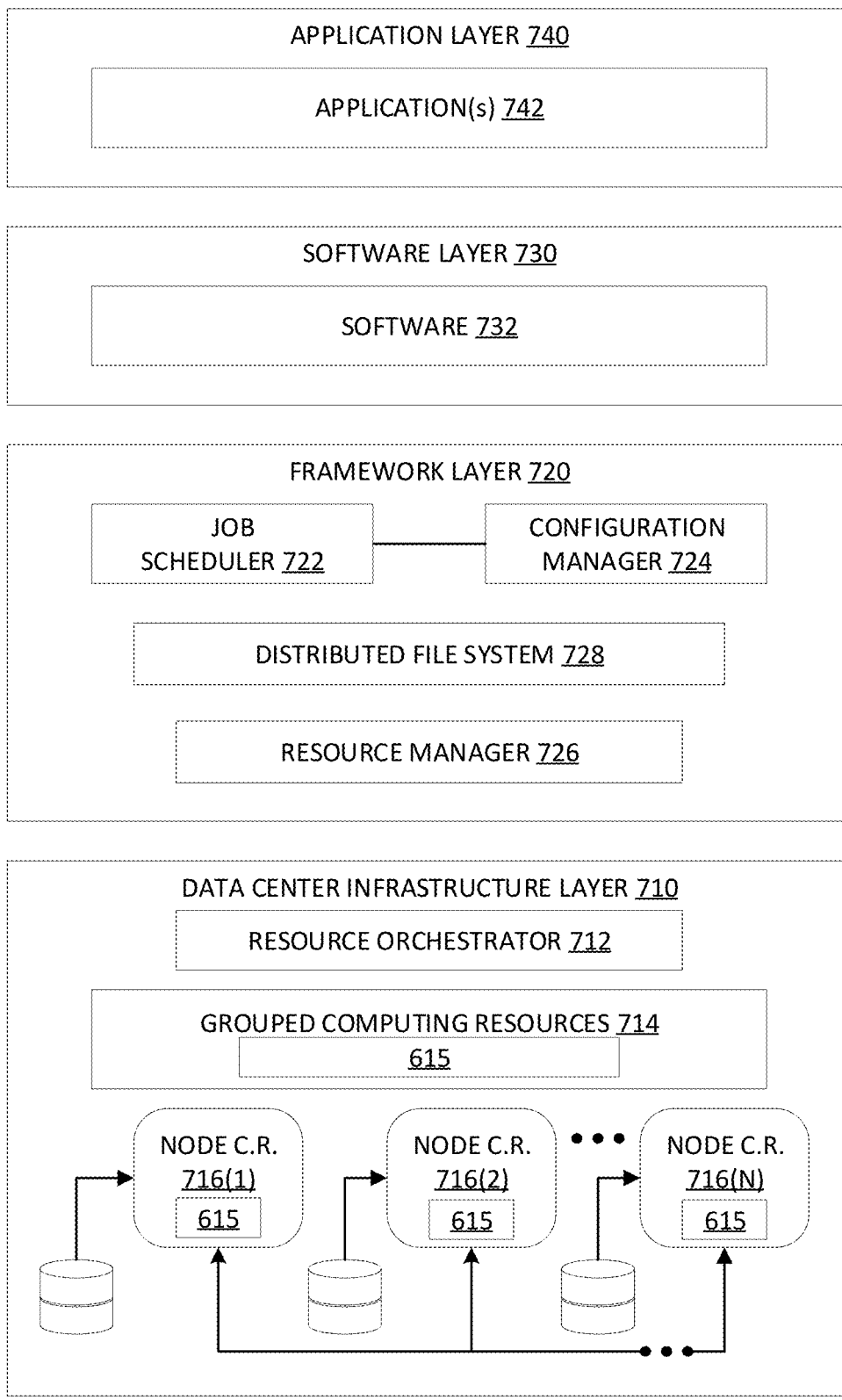
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Computer Systems

Figure 8:
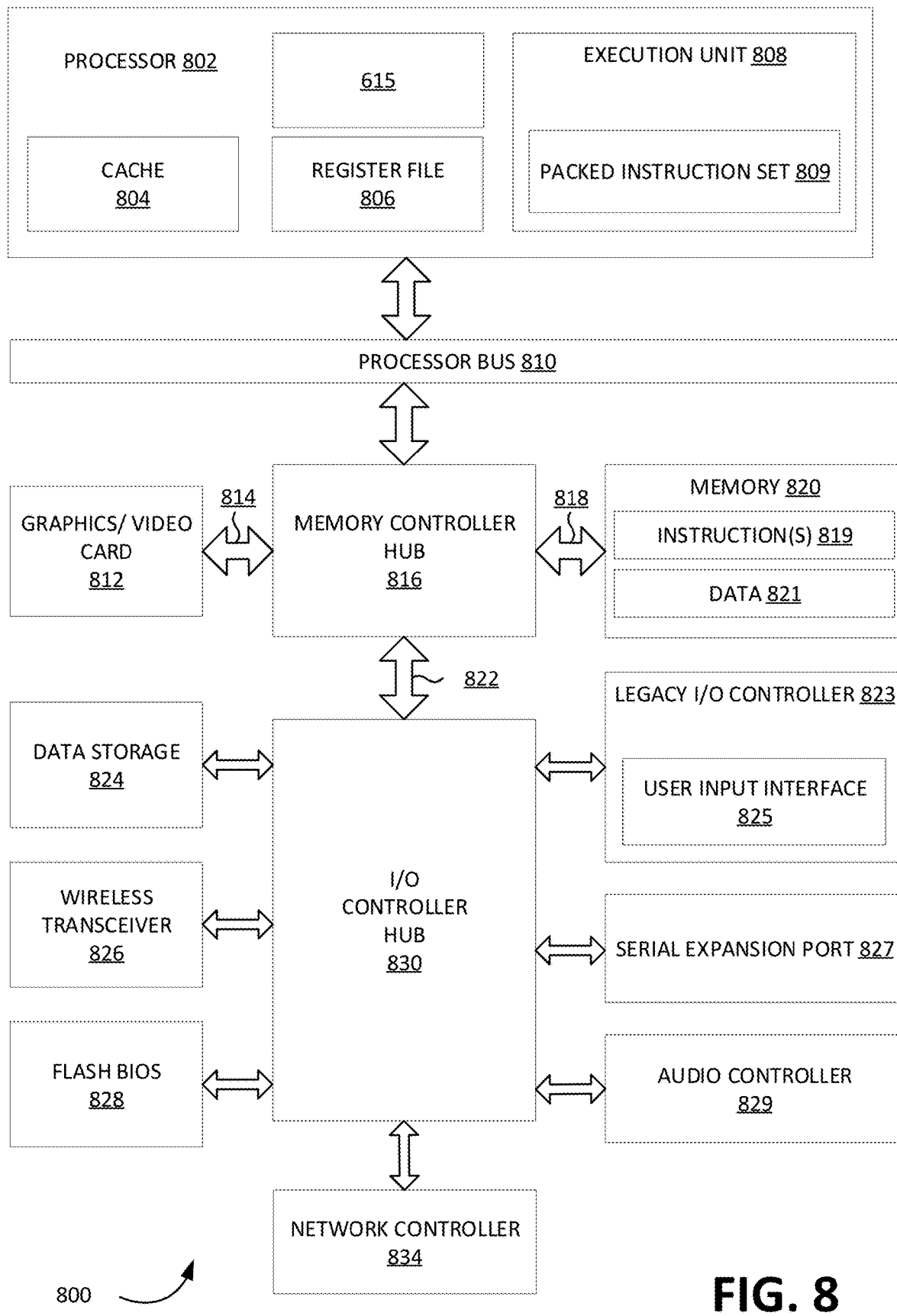
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834, which may include in some embodiments, a data processing unit. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips," whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
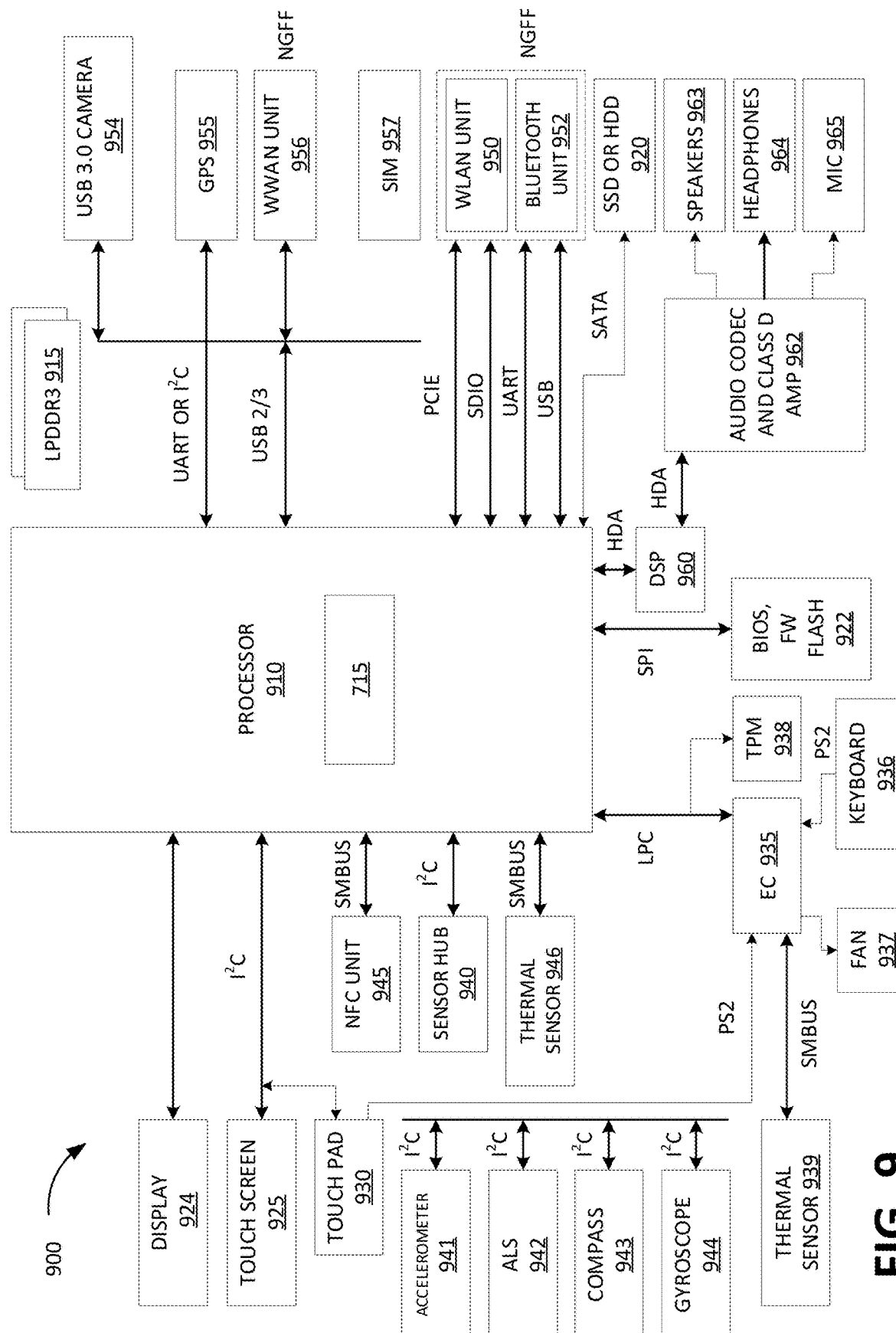
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° ° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips," whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 936, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 10:
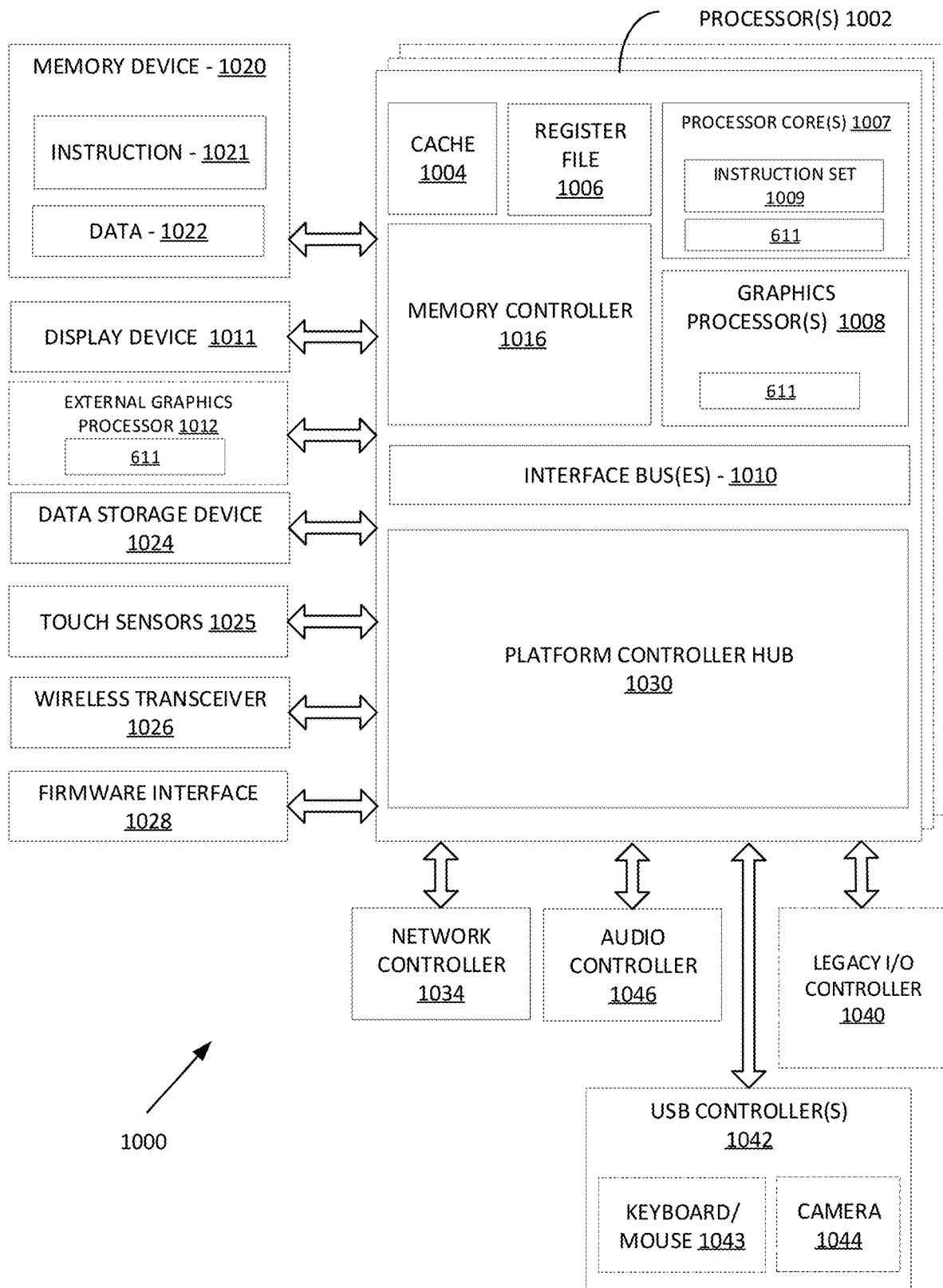
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, edge, or embedded devices.

In at least one embodiment, system 1000 may include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 may also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 may have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, may be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 may be a dynamic random access memory (DRAM) device, a static random access memory (SRAM) device, flash memory device, phase-change memory device, or some other memory device having suitable performance to serve as process memory. In at least one embodiment memory device 1020 may operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 may connect to processor(s) 1002. In at least one embodiment display device 1011 may include one or more of an internal display device, as in a mobile electronic device or a laptop device or an external display device attached via a display interface (e.g., DisplayPort, etc.). In at least one embodiment, display device 1011 may include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 may connect via a storage interface (e.g., SATA) or via a peripheral bus, such as a Peripheral Component Interconnect bus (e.g., PCI, PCI Express). In at least one embodiment, touch sensors 1025 may include touch screen sensors, pressure sensors, or fingerprint sensors. In at least one embodiment, wireless transceiver 1026 may be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and may be, for example, a unified extensible firmware interface (UEFI). In at least one embodiment, network controller 1034 may enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 may also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 may include an external memory controller 1016 and platform controller hub 1030, which may be configured as a memory controller hub and peripheral controller hub within a system chipset that is in communication with processor(s) 1002.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into graphics processor 1100. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 6A or 6B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 11:
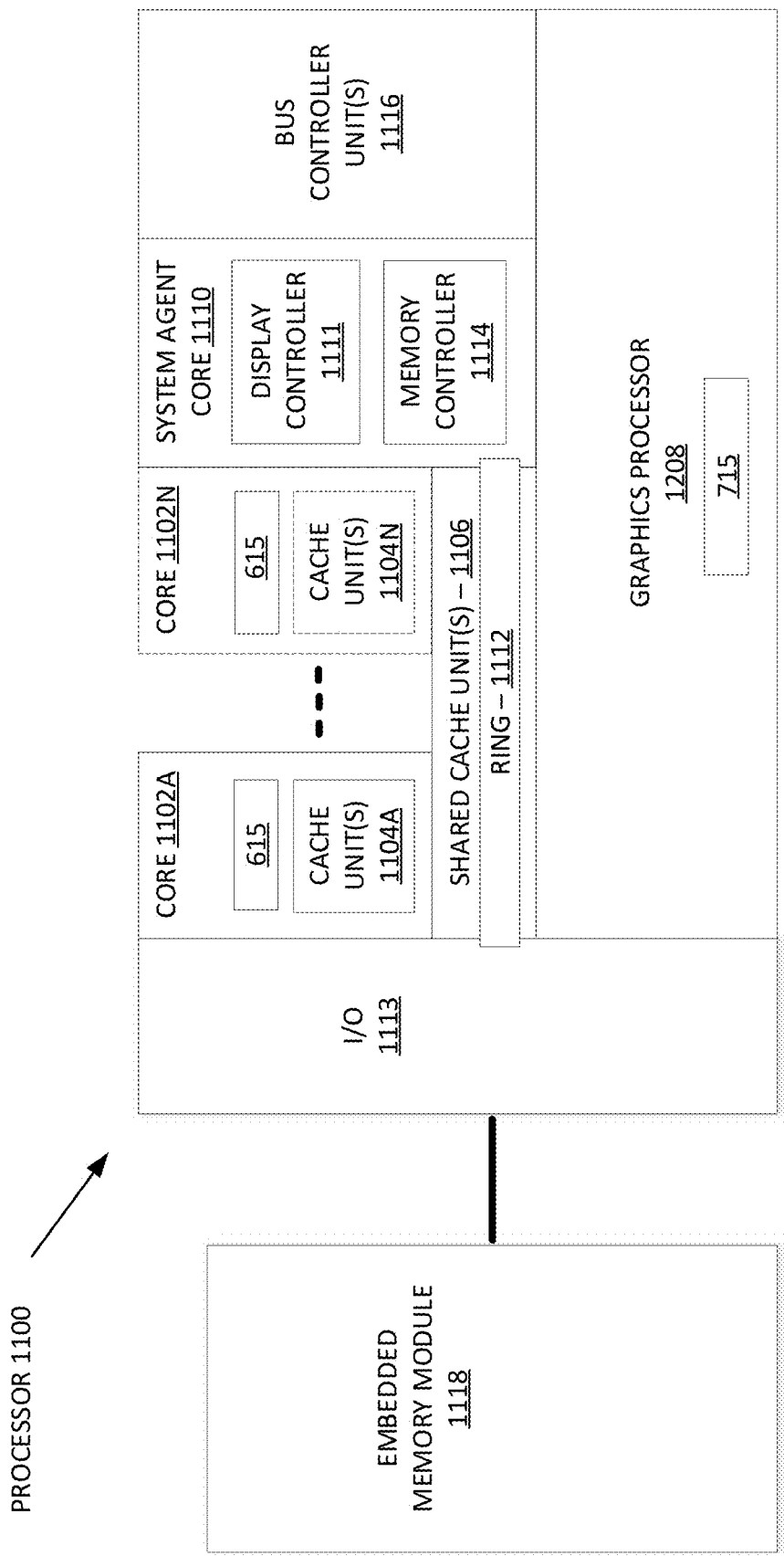
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 may include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multithreading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 may be implemented on one or more chips or as a SoC integrated circuit.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into processor 1100. For example, in at least one embodiment, training and/or inferencing techniques described herein may use one or more of ALUs embodied in graphics processor 1108, graphics core(s) 1102A-1102N, or other components in FIG. 11. Moreover, in at least one embodiment, inferencing and/or training operations described herein may be done using logic other than logic illustrated in FIGS. 6A or 6B. In at least one embodiment, weight parameters may be stored in on-chip or off-chip memory and/or registers (shown or not shown) that configure ALUs of graphics processor 1100 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Virtualized Computing Platform

Figure 12:
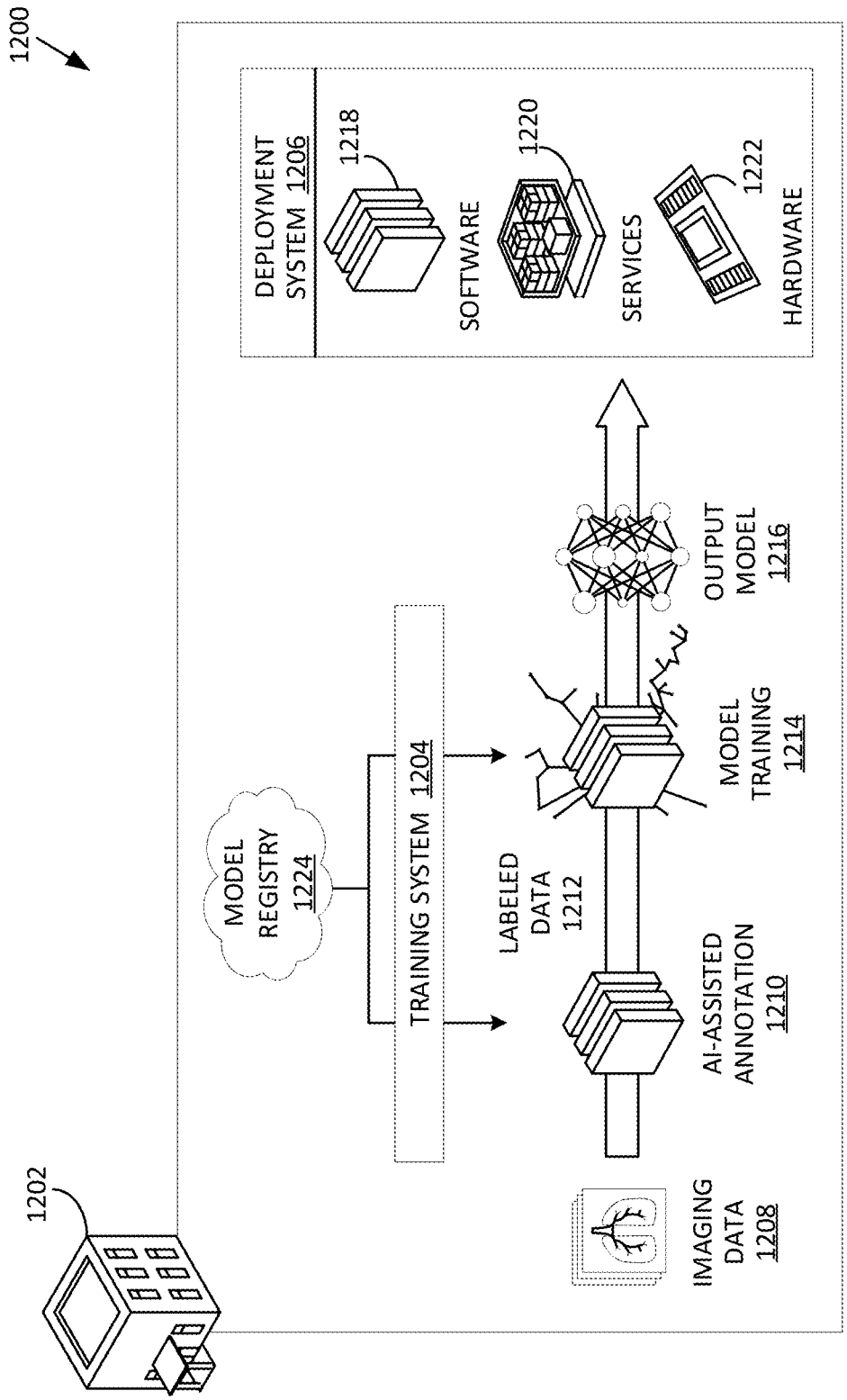
FIG. 12 is an example data flow diagram for an advanced computing pipeline, in accordance with at least one embodiment.

FIG. 12 is an example data flow diagram for a process 1200 of generating and deploying an image processing and inferencing pipeline, in accordance with at least one embodiment. In at least one embodiment, process 1200 may be deployed for use with imaging devices, processing devices, and/or other device types at one or more facilities 1202. Process 1200 may be executed within a training system 1204 and/or a deployment system 1206. In at least one embodiment, training system 1204 may be used to perform training, deployment, and implementation of machine learning models (e.g., neural networks, object detection algorithms, computer vision algorithms, etc.) for use in deployment system 1206. In at least one embodiment, deployment system 1206 may be configured to offload processing and compute resources among a distributed computing environment to reduce infrastructure requirements at facility 1202. In at least one embodiment, one or more applications in a pipeline may use or call upon services (e.g., inference, visualization, compute, AI, etc.) of deployment system 1206 during execution of applications.

In at least one embodiment, some of applications used in advanced processing and inferencing pipelines may use machine learning models or other AI to perform one or more processing steps. In at least one embodiment, machine learning models may be trained at facility 1202 using data 1208 (such as imaging data) generated at facility 1202 (and stored on one or more picture archiving and communication system (PACS) servers at facility 1202), may be trained using imaging or sequencing data 1208 from another facility (ies), or a combination thereof. In at least one embodiment, training system 1204 may be used to provide applications, services, and/or other resources for generating working, deployable machine learning models for deployment system 1206.

In at least one embodiment, model registry 1224 may be backed by object storage that may support versioning and object metadata. In at least one embodiment, object storage may be accessible through, for example, a cloud storage (e.g., cloud 1326 of FIG. 13) compatible application programming interface (API) from within a cloud platform. In at least one embodiment, machine learning models within model registry 1224 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility 1202 is training their own machine learning model, or has an existing machine learning model that needs to be optimized or updated. In at least one embodiment, imaging data 1208 generated by imaging device(s), sequencing devices, and/or other device types may be received. In at least one embodiment, once imaging data 1208 is received, AI-assisted annotation 1210 may be used to aid in generating annotations corresponding to imaging data 1208 to be used as ground truth data for a machine learning model. In at least one embodiment, AI-assisted annotation 1210 may include one or more machine learning models (e.g., convolutional neural networks (CNNs)) that may be trained to generate annotations corresponding to certain types of imaging data 1208 (e.g., from certain devices). In at least one embodiment, AI-assisted annotations 1210 may then be used directly, or may be adjusted or fine-tuned using an annotation tool to generate ground truth data. In at least one embodiment, AI-assisted annotations 1210, labeled clinic data 1212, or a combination thereof may be used as ground truth data for training a machine learning model. In at least one embodiment, a trained machine learning model may be referred to as output model 1216, and may be used by deployment system 1206, as described herein.

In at least one embodiment, training pipeline 1304 (FIG. 13) may include a scenario where facility 1202 needs a machine learning model for use in performing one or more processing tasks for one or more applications in deployment system 1206, but facility 1202 may not currently have such a machine learning model (or may not have a model that is optimized, efficient, or effective for such purposes). In at least one embodiment, an existing machine learning model may be selected from a model registry 1224. In at least one embodiment, model registry 1224 may include machine learning models trained to perform a variety of different inference tasks on imaging data. In at least one embodiment, machine learning models in model registry 1224 may have been trained on imaging data from different facilities than facility 1202 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1224. In at least one embodiment, a machine learning model may then be retrained, or updated, at any number of other facilities, and a retrained or updated model may be made available in model registry 1224. In at least one embodiment, a machine learning model may then be selected from model registry 1224—and referred to as output model 1216—and may be used in deployment system 1206 to perform one or more processing tasks for one or more applications of a deployment system.

In at least one embodiment, training pipeline 1304 (FIG. 13), a scenario may include facility 1202 requiring a machine learning model for use in performing one or more processing tasks for one or more applications in deployment system 1206, but facility 1202 may not currently have such a machine learning model (or may not have a model that is optimized, efficient, or effective for such purposes). In at least one embodiment, a machine learning model selected from model registry 1224 may not be fine-tuned or optimized for imaging data 1208 generated at facility 1202 because of differences in populations, robustness of training data used to train a machine learning model, diversity in anomalies of training data, and/or other issues with training data. In at least one embodiment, AI-assisted annotation 1210 may be used to aid in generating annotations corresponding to imaging data 1208 to be used as ground truth data for retraining or updating a machine learning model. In at least one embodiment, labeled data 1212 may be used as ground truth data for training a machine learning model. In at least one embodiment, retraining or updating a machine learning model may be referred to as model training 1214. In at least one embodiment, model training 1214—e.g., AI-assisted annotations 1210, labeled clinic data 1212, or a combination thereof—may be used as ground truth data for retraining or updating a machine learning model. In at least one embodiment, a trained machine learning model may be referred to as output model 1216, and may be used by deployment system 1206, as described herein.

In at least one embodiment, deployment system 1206 may include software 1218, services 1220, hardware 1222, and/or other components, features, and functionality. In at least one embodiment, deployment system 1206 may include a software "stack," such that software 1218 may be built on top of services 1220 and may use services 1220 to perform some or all of processing tasks, and services 1220 and software 1218 may be built on top of hardware 1222 and use hardware 1222 to execute processing, storage, and/or other compute tasks of deployment system 1206. In at least one embodiment, software 1218 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1208, in addition to containers that receive and configure imaging data for use by each container and/or for use by facility 1202 after processing through a pipeline (e.g., to convert outputs back to a usable data type). In at least one embodiment, a combination of containers within software 1218 (e.g., that make up a pipeline) may be referred to as a virtual instrument (as described in more detail herein), and a virtual instrument may leverage services 1220 and hardware 1222 to execute some or all processing tasks of applications instantiated in containers.

In at least one embodiment, a data processing pipeline may receive input data (e.g., imaging data 1208) in a specific format in response to an inference request (e.g., a request from a user of deployment system 1206). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1216 of training system 1204.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1224 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1220 as a system (e.g., system 1300 of FIG. 13). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

Figure 13:
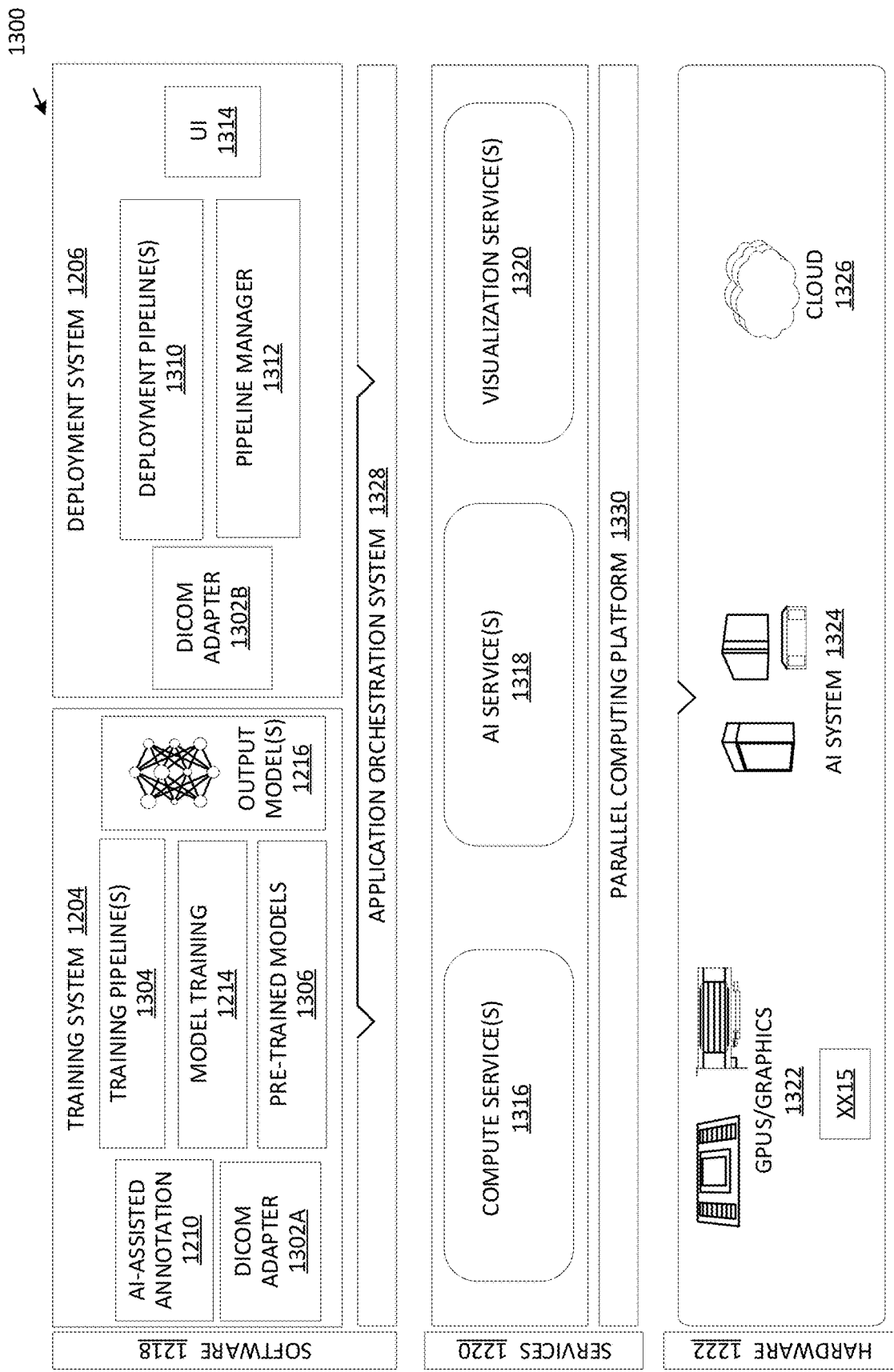
FIG. 13 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1224. In at least one embodiment, a requesting entity—who provides an inference or image processing request—may browse a container registry and/or model registry 1224 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1206 (e.g., a cloud) to perform processing of data processing pipeline. In at least one embodiment, processing by deployment system 1206 may include referencing selected elements (e.g., applications, containers, models, etc.) from a container registry and/or model registry 1224. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1220 may be leveraged. In at least one embodiment, services 1220 may include compute services, artificial intelligence (AI) services, visualization services, and/or other service types. In at least one embodiment, services 1220 may provide functionality that is common to one or more applications in software 1218, so functionality may be abstracted to a service that may be called upon or leveraged by applications. In at least one embodiment, functionality provided by services 1220 may run dynamically and more efficiently, while also scaling well by allowing applications to process data in parallel (e.g., using a parallel computing platform 1330 (FIG. 13)). In at least one embodiment, rather than each application that shares a same functionality offered by a service 1220 being required to have a respective instance of service 1220, service 1220 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc. —to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1220 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1218 implementing advanced processing and inferencing pipeline that includes segmentation application and anomaly detection application may be streamlined because each application may call upon a same inference service to perform one or more inferencing tasks.

In at least one embodiment, hardware 1222 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1222 may be used to provide efficient, purpose-built support for software 1218 and services 1220 in deployment system 1206. In at least one embodiment, use of GPU processing may be implemented for processing locally (e.g., at facility 1202), within an AI/deep learning system, in a cloud system, and/or in other processing components of deployment system 1206 to improve efficiency, accuracy, and efficacy of image processing and generation. In at least one embodiment, software 1218 and/or services 1220 may be optimized for GPU processing with respect to deep learning, machine learning, and/or high-performance computing, as non-limiting examples. In at least one embodiment, at least some of computing environment of deployment system 1206 and/or training system 1204 may be executed in a datacenter one or more supercomputers or high performance computing systems, with GPU optimized software (e.g., hardware and software combination of NVIDIA's DGX System). In at least one embodiment, hardware 1222 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 13 is a system diagram for an example system 1300 for generating and deploying an imaging deployment pipeline, in accordance with at least one embodiment. In at least one embodiment, system 1300 may be used to implement process 1200 of FIG. 12 and/or other processes including advanced processing and inferencing pipelines. In at least one embodiment, system 1300 may include training system 1204 and deployment system 1206. In at least one embodiment, training system 1204 and deployment system 1206 may be implemented using software 1218, services 1220, and/or hardware 1222, as described herein.

In at least one embodiment, system 1300 (e.g., training system 1204 and/or deployment system 1206) may implemented in a cloud computing environment (e.g., using cloud 1326). In at least one embodiment, system 1300 may be implemented locally with respect to a healthcare services facility, or as a combination of both cloud and local computing resources. In at least one embodiment, access to APIs in cloud 1326 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1300, may be restricted to a set of public IPs that have been vetted or authorized for interaction.

In at least one embodiment, various components of system 1300 may communicate between and among one another using any of a variety of different network types, including but not limited to local area networks (LANs) and/or wide area networks (WANs) via wired and/or wireless communication protocols. In at least one embodiment, communication between facilities and components of system 1300 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1204 may execute training pipelines 1304, similar to those described herein with respect to FIG. 12. In at least one embodiment, where one or more machine learning models are to be used in deployment pipelines 1310 by deployment system 1206, training pipelines 1304 may be used to train or retrain one or more (e.g. pre-trained) models, and/or implement one or more of pre-trained models 1306 (e.g., without a need for retraining or updating). In at least one embodiment, as a result of training pipelines 1304, output model(s) 1216 may be generated. In at least one embodiment, training pipelines 1304 may include any number of processing steps, such as but not limited to imaging data (or other input data) conversion or adaption In at least one embodiment, for different machine learning models used by deployment system 1206, different training pipelines 1304 may be used. In at least one embodiment, training pipeline 1304 similar to a first example described with respect to FIG. 12 may be used for a first machine learning model, training pipeline 1304 similar to a second example described with respect to FIG. 12 may be used for a second machine learning model, and training pipeline 1304 similar to a third example described with respect to FIG. 12 may be used for a third machine learning model. In at least one embodiment, any combination of tasks within training system 1204 may be used depending on what is required for each respective machine learning model. In at least one embodiment, one or more of machine learning models may already be trained and ready for deployment so machine learning models may not undergo any processing by training system 1204, and may be implemented by deployment system 1206.

In at least one embodiment, output model(s) 1216 and/or pre-trained model(s) 1306 may include any types of machine learning models depending on implementation or embodiment. In at least one embodiment, and without limitation, machine learning models used by system 1300 may include machine learning model(s) using linear regression, logistic regression, decision trees, support vector machines (SVM), Naïve Bayes, k-nearest neighbor (KNN), K means clustering, random forest, dimensionality reduction algorithms, gradient boosting algorithms, neural networks (e.g., autoencoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 14A:
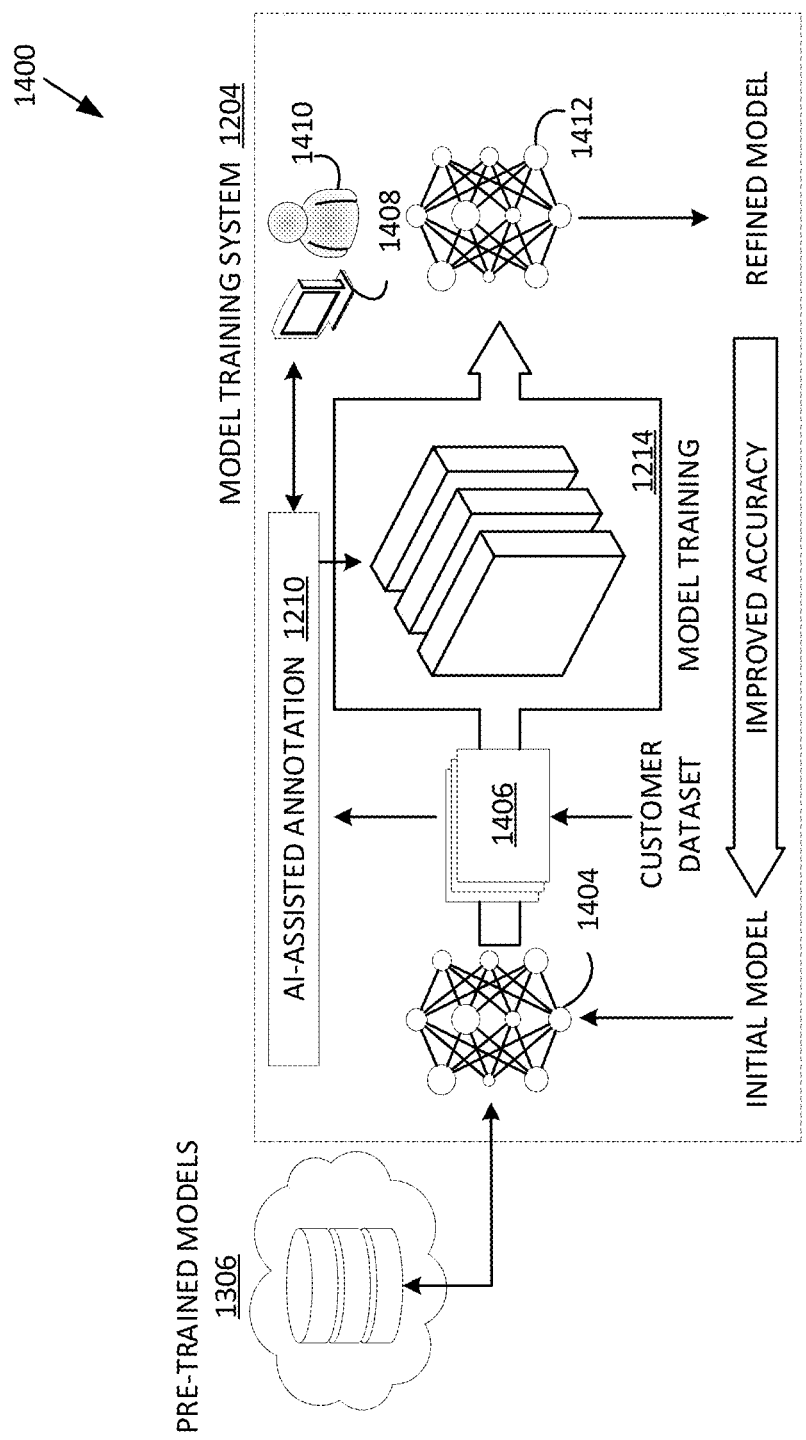
FIGS. 14A and 14B illustrate a data flow diagram for a process to train a machine learning model, as well as client-server architecture to enhance annotation tools with pre-trained annotation models, in accordance with at least one embodiment.
Figure 14B:
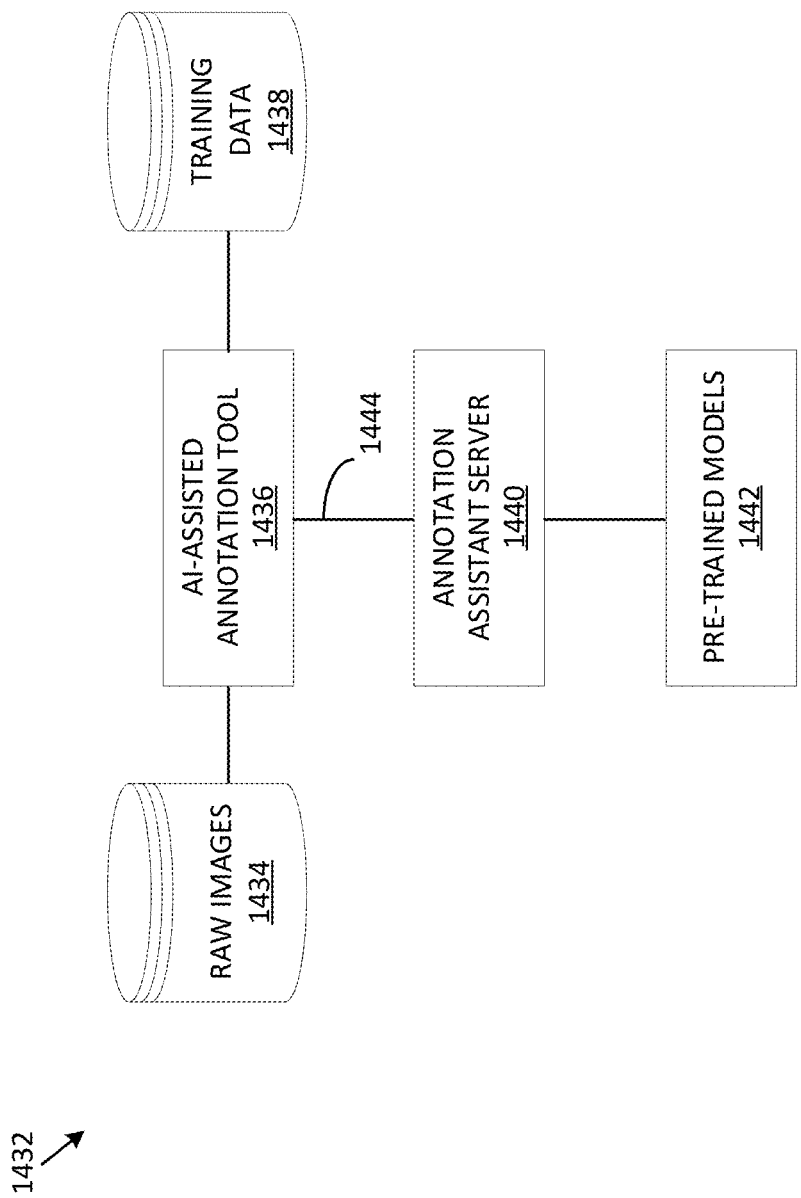

In at least one embodiment, training pipelines 1304 may include AI-assisted annotation, as described in more detail herein with respect to at least FIG. 14B. In at least one embodiment, labeled data 1212 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1208 (or other data type used by machine learning models), there may be corresponding ground truth data generated by training system 1204. In at least one embodiment, AI-assisted annotation may be performed as part of deployment pipelines 1310; either in addition to, or in lieu of AI-assisted annotation included in training pipelines 1304. In at least one embodiment, system 1300 may include a multi-layer platform that may include a software layer (e.g., software 1218) of diagnostic applications (or other application types) that may perform one or more medical imaging and diagnostic functions. In at least one embodiment, system 1300 may be communicatively coupled to (e.g., via encrypted links) PACS server networks of one or more facilities. In at least one embodiment, system 1300 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1202). In at least one embodiment, applications may then call or execute one or more services 1220 for performing compute, AI, or visualization tasks associated with respective applications, and software 1218 and/or services 1220 may leverage hardware 1222 to perform processing tasks in an effective and efficient manner.

In at least one embodiment, deployment system 1206 may execute deployment pipelines 1310. In at least one embodiment, deployment pipelines 1310 may include any number of applications that may be sequentially, non-sequentially, or otherwise applied to imaging data (and/or other data types) generated by imaging devices, sequencing devices, genomics devices, etc. —including AI-assisted annotation, as described above. In at least one embodiment, as described herein, a deployment pipeline 1310 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1310 depending on information desired from data generated by a device. In at least one embodiment, where detections of anomalies are desired from an MRI machine, there may be a first deployment pipeline 1310, and where image enhancement is desired from output of an MRI machine, there may be a second deployment pipeline 1310.

In at least one embodiment, an image generation application may include a processing task that includes use of a machine learning model. In at least one embodiment, a user may desire to use their own machine learning model, or to select a machine learning model from model registry 1224. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1300—such as services 1220 and hardware 1222—deployment pipelines 1310 may be even more user friendly, provide for easier integration, and produce more accurate, efficient, and timely results.

In at least one embodiment, deployment system 1206 may include a user interface 1314 (e.g., a graphical user interface, a web interface, etc.) that may be used to select applications for inclusion in deployment pipeline(s) 1310, arrange applications, modify, or change applications or parameters or constructs thereof, use and interact with deployment pipeline(s) 1310 during set-up and/or deployment, and/or to otherwise interact with deployment system 1206. In at least one embodiment, although not illustrated with respect to training system 1204, user interface 1314 (or a different user interface) may be used for selecting models for use in deployment system 1206, for selecting models for training, or retraining, in training system 1204, and/or for otherwise interacting with training system 1204.

In at least one embodiment, pipeline manager 1312 may be used, in addition to an application orchestration system 1328, to manage interaction between applications or containers of deployment pipeline(s) 1310 and services 1220 and/or hardware 1222. In at least one embodiment, pipeline manager 1312 may be configured to facilitate interactions from application to application, from application to service 1220, and/or from application or service to hardware 1222. In at least one embodiment, although illustrated as included in software 1218, this is not intended to be limiting, and in some examples (e.g., as illustrated in FIG. 11) pipeline manager 1312 may be included in services 1220. In at least one embodiment, application orchestration system 1328 (e.g., Kubernetes, DOCKER, etc.) may include a container orchestration system that may group applications into containers as logical units for coordination, management, scaling, and deployment. In at least one embodiment, by associating applications from deployment pipeline(s) 1310 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1312 and application orchestration system 1328. In at least one embodiment, so long as an expected input and/or output of each container or application is known by a system (e.g., based on constructs of applications or containers), application orchestration system 1328 and/or pipeline manager 1312 may facilitate communication among and between, and sharing of resources among and between, each of applications or containers. In at least one embodiment, because one or more of applications or containers in deployment pipeline(s) 1310 may share same services and resources, application orchestration system 1328 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1328) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1220 leveraged by and shared by applications or containers in deployment system 1206 may include compute services 1316, AI services 1318, visualization services 1320, and/or other service types. In at least one embodiment, applications may call (e.g., execute) one or more of services 1220 to perform processing operations for an application. In at least one embodiment, compute services 1316 may be leveraged by applications to perform super-computing or other high-performance computing (HPC) tasks. In at least one embodiment, compute service(s) 1316 may be leveraged to perform parallel processing (e.g., using a parallel computing platform 1330) for processing data through one or more of applications and/or one or more tasks of a single application, substantially simultaneously. In at least one embodiment, parallel computing platform 1330 (e.g., NVIDIA's CUDA) may enable general purpose computing on GPUs (GPGPU) (e.g., GPUs 1322). In at least one embodiment, a software layer of parallel computing platform 1330 may provide access to virtual instruction sets and parallel computational elements of GPUs, for execution of compute kernels. In at least one embodiment, parallel computing platform 1330 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1330 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1318 may be leveraged to perform inferencing services for executing machine learning model(s) associated with applications (e.g., tasked with performing one or more processing tasks of an application). In at least one embodiment, AI services 1318 may leverage AI system 1324 to execute machine learning model(s) (e.g., neural networks, such as CNNs) for segmentation, reconstruction, object detection, feature detection, classification, and/or other inferencing tasks. In at least one embodiment, applications of deployment pipeline (s) 1310 may use one or more of output models 1216 from training system 1204 and/or other models of applications to perform inference on imaging data. In at least one embodiment, two or more examples of inferencing using application orchestration system 1328 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1328 may distribute resources (e.g., services 1220 and/or hardware 1222) based on priority paths for different inferencing tasks of AI services 1318.

In at least one embodiment, shared storage may be mounted to AI services 1318 within system 1300. In at least one embodiment, shared storage may operate as a cache (or other storage device type) and may be used to process inference requests from applications. In at least one embodiment, when an inference request is submitted, a request may be received by a set of API instances of deployment system 1206, and one or more instances may be selected (e.g., for best fit, for load balancing, etc.) to process a request. In at least one embodiment, to process a request, a request may be entered into a database, a machine learning model may be located from model registry 1224 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1312) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<12 min). In at least one embodiment, model execution times may be measured from requesting institution or entity and may include partner network traversal time, as well as execution on an inference service.

In at least one embodiment, transfer of requests between services 1220 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1326, and an inference service may perform inferencing on a GPU.

In at least one embodiment, visualization services 1320 may be leveraged to generate visualizations for viewing outputs of applications and/or deployment pipeline(s) 1310. In at least one embodiment, GPUs 1322 may be leveraged by visualization services 1320 to generate visualizations. In at least one embodiment, rendering effects, such as ray-tracing, may be implemented by visualization services 1320 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1320 may include an internal visualizer, cinematics, and/or other rendering or image processing capabilities or functionality (e.g., ray tracing, rasterization, internal optics, etc.).

In at least one embodiment, hardware 1222 may include GPUs 1322, AI system 1324, cloud 1326, and/or any other hardware used for executing training system 1204 and/or deployment system 1206. In at least one embodiment, GPUs 1322 (e.g., NVIDIA's TESLA and/or QUADRO GPUs) may include any number of GPUs that may be used for executing processing tasks of compute services 1316, AI services 1318, visualization services 1320, other services, and/or any of features or functionality of software 1218. For example, with respect to AI services 1318, GPUs 1322 may be used to perform pre-processing on imaging data (or other data types used by machine learning models), post-processing on outputs of machine learning models, and/or to perform inferencing (e.g., to execute machine learning models). In at least one embodiment, cloud 1326, AI system 1324, and/or other components of system 1300 may use GPUs 1322. In at least one embodiment, cloud 1326 may include a GPU-optimized platform for deep learning tasks. In at least one embodiment, AI system 1324 may use GPUs, and cloud 1326—or at least a portion tasked with deep learning or inferencing—may be executed using one or more AI systems 1324. As such, although hardware 1222 is illustrated as discrete components, this is not intended to be limiting, and any components of hardware 1222 may be combined with, or leveraged by, any other components of hardware 1222.

In at least one embodiment, AI system 1324 may include a purpose-built computing system (e.g., a super-computer or an HPC) configured for inferencing, deep learning, machine learning, and/or other artificial intelligence tasks. In at least one embodiment, AI system 1324 (e.g., NVIDIA's DGX) may include GPU-optimized software (e.g., a software stack) that may be executed using a plurality of GPUs 1322, in addition to DPUs, CPUs, RAM, storage, and/or other components, features, or functionality. In at least one embodiment, one or more AI systems 1324 may be implemented in cloud 1326 (e.g., in a data center) for performing some or all of AI-based processing tasks of system 1300.

In at least one embodiment, cloud 1326 may include a GPU-accelerated infrastructure (e.g., NVIDIA's NGC) that may provide a GPU-optimized platform for executing processing tasks of system 1300. In at least one embodiment, cloud 1326 may include an AI system(s) 1324 for performing one or more of AI-based tasks of system 1300 (e.g., as a hardware abstraction and scaling platform). In at least one embodiment, cloud 1326 may integrate with application orchestration system 1328 leveraging multiple GPUs to enable seamless scaling and load balancing between and among applications and services 1220. In at least one embodiment, cloud 1326 may tasked with executing at least some of services 1220 of system 1300, including compute services 1316, AI services 1318, and/or visualization services 1320, as described herein. In at least one embodiment, cloud 1326 may perform small and large batch inference (e.g., executing NVIDIA's TENSOR RT), provide an accelerated parallel computing API and platform 1330 (e.g., NVIDIA's CUDA), execute application orchestration system 1328 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1300.

FIG. 14A illustrates a data flow diagram for a process 1400 to train, retrain, or update a machine learning model, in accordance with at least one embodiment. In at least one embodiment, process 1400 may be executed using, as a non-limiting example, system 1300 of FIG. 13. In at least one embodiment, process 1400 may leverage services 1220 and/or hardware 1222 of system 1300, as described herein. In at least one embodiment, refined models 1412 generated by process 1400 may be executed by deployment system 1206 for one or more containerized applications in deployment pipelines 1310.

In at least one embodiment, model training 1214 may include retraining or updating an initial model 1404 (e.g., a pre-trained model) using new training data (e.g., new input data, such as customer dataset 1406, and/or new ground truth data associated with input data). In at least one embodiment, to retrain, or update, initial model 1404, output or loss layer(s) of initial model 1404 may be reset, or deleted, and/or replaced with an updated or new output or loss layer(s). In at least one embodiment, initial model 1404 may have previously fine-tuned parameters (e.g., weights and/or biases) that remain from prior training, so training or retraining 1214 may not take as long or require as much processing as training a model from scratch. In at least one embodiment, during model training 1214, by having reset or replaced output or loss layer(s) of initial model 1404, parameters may be updated and re-tuned for a new data set based on loss calculations associated with accuracy of output or loss layer(s) at generating predictions on new, customer dataset 1406 (e.g., image data 1208 of FIG. 12).

In at least one embodiment, pre-trained models 1306 may be stored in a data store, or registry (e.g., model registry 1224 of FIG. 12). In at least one embodiment, pre-trained models 1306 may have been trained, at least in part, at one or more facilities other than a facility executing process 1400. In at least one embodiment, to protect privacy and rights of patients, subjects, or clients of different facilities, pre-trained models 1306 may have been trained, on-premise, using customer or patient data generated on-premise. In at least one embodiment, pre-trained models 1306 may be trained using cloud 1326 and/or other hardware 1222, but confidential, privacy protected patient data may not be transferred to, used by, or accessible to any components of cloud 1326 (or other off premise hardware). In at least one embodiment, where a pre-trained model 1306 is trained at using patient data from more than one facility, pre-trained model 1306 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1306 on-premise and/or off premise, such as in a datacenter or other cloud computing infrastructure.

In at least one embodiment, when selecting applications for use in deployment pipelines 1310, a user may also select machine learning models to be used for specific applications. In at least one embodiment, a user may not have a model for use, so a user may select a pre-trained model 1306 to use with an application. In at least one embodiment, pre-trained model 1306 may not be optimized for generating accurate results on customer dataset 1406 of a facility of a user (e.g., based on patient diversity, demographics, types of medical imaging devices used, etc.). In at least one embodiment, prior to deploying pre-trained model 1306 into deployment pipeline 1310 for use with an application(s), pre-trained model 1306 may be updated, retrained, and/or fine-tuned for use at a respective facility.

In at least one embodiment, a user may select pre-trained model 1306 that is to be updated, retrained, and/or fine-tuned, and pre-trained model 1306 may be referred to as initial model 1404 for training system 1204 within process 1400. In at least one embodiment, customer dataset 1406 (e.g., imaging data, genomics data, sequencing data, or other data types generated by devices at a facility) may be used to perform model training 1214 (which may include, without limitation, transfer learning) on initial model 1404 to generate refined model 1412. In at least one embodiment, ground truth data corresponding to customer dataset 1406 may be generated by training system 1204. In at least one embodiment, ground truth data may be generated, at least in part, by clinicians, scientists, doctors, practitioners, at a facility (e.g., as labeled clinic data 1212 of FIG. 12).

In at least one embodiment, AI-assisted annotation 1210 may be used in some examples to generate ground truth data. In at least one embodiment, AI-assisted annotation 1210 (e.g., implemented using an AI-assisted annotation SDK) may leverage machine learning models (e.g., neural networks) to generate suggested or predicted ground truth data for a customer dataset. In at least one embodiment, user 1410 may use annotation tools within a user interface (a graphical user interface (GUI)) on computing device 1408.

In at least one embodiment, user 1410 may interact with a GUI via computing device 1408 to edit or fine-tune (auto)annotations. In at least one embodiment, a polygon editing feature may be used to move vertices of a polygon to more accurate or fine-tuned locations.

In at least one embodiment, once customer dataset 1406 has associated ground truth data, ground truth data (e.g., from AI-assisted annotation, manual labeling, etc.) may be used by during model training 1214 to generate refined model 1412. In at least one embodiment, customer dataset 1406 may be applied to initial model 1404 any number of times, and ground truth data may be used to update parameters of initial model 1404 until an acceptable level of accuracy is attained for refined model 1412. In at least one embodiment, once refined model 1412 is generated, refined model 1412 may be deployed within one or more deployment pipelines 1310 at a facility for performing one or more processing tasks with respect to medical imaging data.

In at least one embodiment, refined model 1412 may be uploaded to pre-trained models 1306 in model registry 1224 to be selected by another facility. In at least one embodiment, his process may be completed at any number of facilities such that refined model 1412 may be further refined on new datasets any number of times to generate a more universal model.

FIG. 14B is an example illustration of a client-server architecture 1432 to enhance annotation tools with pre-trained annotation models, in accordance with at least one embodiment. In at least one embodiment, AI-assisted annotation tools 1436 may be instantiated based on a client-server architecture 1432. In at least one embodiment, annotation tools 1436 in imaging applications may aid radiologists, for example, identify organs and abnormalities. In at least one embodiment, imaging applications may include software tools that help user 1410 to identify, as a non-limiting example, a few extreme points on a particular organ of interest in raw images 1434 (e.g., in a 3D MRI or CT scan) and receive auto-annotated results for all 2D slices of a particular organ. In at least one embodiment, results may be stored in a data store as training data 1438 and used as (for example and without limitation) ground truth data for training. In at least one embodiment, when computing device 1408 sends extreme points for AI-assisted annotation 1210, a deep learning model, for example, may receive this data as input and return inference results of a segmented organ or abnormality. In at least one embodiment, pre-instantiated annotation tools, such as AI-Assisted Annotation Tool 1436B in FIG. 14B, may be enhanced by making API calls (e.g., API Call 1444) to a server, such as an Annotation Assistant Server 1440 that may include a set of pre-trained models 1442 stored in an annotation model registry, for example. In at least one embodiment, an annotation model registry may store pre-trained models 1442 (e.g., machine learning models, such as deep learning models) that are pre-trained to perform AI-assisted annotation on a particular organ or abnormality. These models may be further updated by using training pipelines 1304. In at least one embodiment, pre-installed annotation tools may be improved over time as new labeled clinic data 1212 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   tracking, based on a first set of images depicting an environment, a state of a first object included in the environment, wherein the first set of images is generated during a first time period;
   determining that the first object is not detected in the environment depicted in a second set of images generated during a second time period that is subsequent to the first time period;
   obtaining one or more predicted future states of the first object in view of the state of the first object in the environment depicted in the first set of images;
   detecting a second object included in the environment depicted in a third set of images generated during a third time period that is subsequent to the second time period, wherein a number of images of the third set of images exceeds a threshold number of images;
   determining whether a current state of the second object corresponds to at least one of the one or more predicted future states of the first object; and
   responsive to determining that a current state of the second object corresponds to at least one of the one or more predicted future states of the first object, updating an identifier associated with the second object to correspond to an identifier associated with the first object.

2. The method of claim 1, wherein obtaining the one or more predicted future states of the first object comprises:
   obtaining state data associated with the first object based on the state of the first object in the environment depicted in each of the first set of images;
   calculating a path that the first object is expected to follow in the environment during a future time period based on the obtained state data; and
   determining the one or more predicted future states of the first object based on the calculated path.

3. The method of claim 2, wherein obtaining the state data associated with the first object comprises:
   providing an indication of at least one of a prior state or a current state of the first object in the environment depicted in each of the first set of images as an input to one or more state prediction functions; and
   determining the state data associated with the first object based on an output of the one or more state prediction functions.

4. The method of claim 2, wherein obtaining the state data associated with the first object comprises:
   providing an indication of at least one of a prior state or a current state of the first object in the environment depicted in each of the first set of images as an input to a machine learning model;
   obtaining one or more outputs of the machine learning model;
   extracting, from the one or more outputs, one or more sets of object state data and, for each set of object state data, an indication of a level of confidence that each set of object state data corresponds to the first object; and
   identifying a set of object state data associated with a level of confidence that satisfies a confidence criterion.

5. The method of claim 4, wherein the machine learning model comprises a recurrent neural network.

6. The method of claim 1, further comprising:
   updating coordinates indicating a path taken by the first object based on the state of the first object included in the environment depicted in the first set of images and the current state of the second object included in the environment depicted in the third set of images.

7. The method of claim 1, wherein tracking the state of the first object comprises:
   obtaining the first set of images and a first set of bounding boxes associated with the first set of images, wherein the first set of bounding boxes indicate one or more regions of the first set of images that include a detected presence of the first object; and
   determining the state of the first object included in the environment depicted in the first set of images based on the first set of bounding boxes.

8. The method of claim 1, wherein determining that the first object is not included in the environment depicted in the second set of images comprises:
   obtaining the second set of images; and
   determining that no bounding boxes associated with the second set of images correspond to a region of a respective image of the second set of images that includes a detected presence of the first object in the environment depicted in the respective image.

9. The method of claim 1, further comprising:
   tracking, based on a fourth set of images depicting the environment, the state of the first object included in the environment, wherein the fourth set of images is generated during a fourth time period that is subsequent to the third time period.

10. A system comprising:
    a memory device; and
    a processing device coupled to the memory device, wherein the processing device is to:
      track, based on a first set of images depicting an environment, a state of a first object included in the environment, wherein the first set of images is generated during a first time period;
      determine that the first object is not detected in the environment depicted in a second set of images generated during a second time period that is subsequent to the first time period;
      obtain one or more predicted future states of the first object in view of the state of the first object in the environment depicted in the first set of images;
      detect a second object included in the environment depicted in a third set of images generated during a third time period that is subsequent to the second time period wherein a number of images of the third set of images exceeds a threshold number of images;

determine whether a current state of the second object corresponds to at least one of the one or more predicted future state of the first object; and responsive to determining that a current state of the second object corresponds to at least one of the one or more predicted future states of the first object, update an identifier associated with the second object to correspond to an identifier associated with the first object.

11. The system of claim 10, wherein to obtain the one or more predicted future states of the first object comprises, the processing device is to:

obtain state data associated with the first object based on the state of the first object in the environment depicted in each of the first set of images;

calculate a path that the first object is expected to follow in the environment during a future time period based on the obtained state data; and determine the one or more predicted future states of the first object based on the calculated path.

12. The system of claim 11, wherein to obtain the state data associated with the first object, the processing device is to:

provide an indication of at least one of a prior state or a current state of the first object in the environment depicted in each of the first set of images as an input to one or more state prediction functions; and determine the state data associated with the first object based on an output of the one or more state prediction functions.

13. The system of claim 11, wherein to obtain the state data associated with the first object, the processing device is to:

provide an indication of at least one of a prior state or a current state of the first object in the environment depicted in each of the first set of images as an input to a machine learning model;

obtain one or more outputs of the machine learning model;

extract, from the one or more outputs, one or more sets of object state data and, for each set of object state data, an indication of a level of confidence that each set of object state data corresponds to the first object; and identify a set of object state data associated with a level of confidence that satisfies a confidence criterion.

14. The system of claim 13, wherein the machine learning model comprises a recurrent neural network.

15. A non-transitory computer readable storage medium comprising instructions that, when executed by a processing device, cause the processing device to:

track, based on a first set of images depicting an environment, a state of a first object included in the environment, wherein the first set of images is generated during a first time period;

determine that the first object is not detected in the environment depicted in a second set of images generated during a second time period that is subsequent to the first time period;

obtain one or more predicted future states of the first object in view of the state of the first object in the environment depicted in the first set of images;

detect a second object included in the environment depicted in a third set of images generated during a third time period that is subsequent to the second time period, wherein a number of images of the third set of images exceeds a threshold number of images;

determine whether a current state of the second object corresponds to at least one of the one or more predicted future state of the first object; and responsive to determining that a current state of the second object corresponds to at least one of the one or more predicted future states of the first object, update an identifier associated with the second object to correspond to an identifier associated with the first object.

16. The non-transitory computer readable storage medium of claim 15, to obtain the one or more predicted future states of the first object comprises, the processing device is to:

obtain state data associated with the first object based on the state of the first object in the environment depicted in each of the first set of images;

calculate a path that the first object is expected to follow in the environment during a future time period based on the obtained state data; and determine the one or more predicted future states of the first object based on the calculated path.

17. The non-transitory computer readable storage medium of claim 16, wherein to obtain the state data associated with the first object, the processing device is to:

provide an indication of at least one of a prior state or a current state of the first object in the environment depicted in each of the first set of images as an input to one or more state prediction functions; and determine the state data associated with the first object based on an output of the one or more state prediction functions.

18. The non-transitory computer readable storage medium of claim 16, wherein to obtain the state data associated with the first object, the processing device is to:

provide an indication of at least one of a prior state or a current state of the first object in the environment depicted in each of the first set of images as an input to a machine learning model;

obtain one or more outputs of the machine learning model;

extract, from the one or more outputs, one or more sets of object state data and, for each set of object state data, an indication of a level of confidence that each set of object state data corresponds to the first object; and identify a set of object state data associated with a level of confidence that satisfies a confidence criterion.

* * * * *